Figure 18:
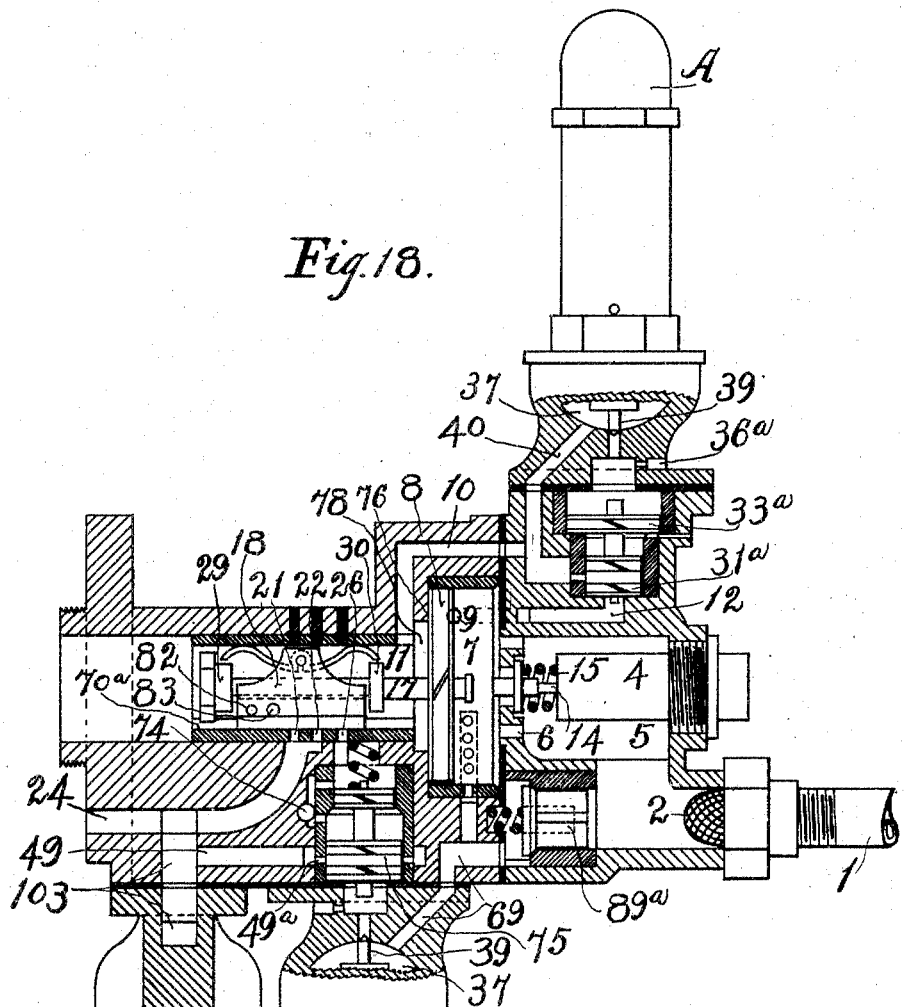

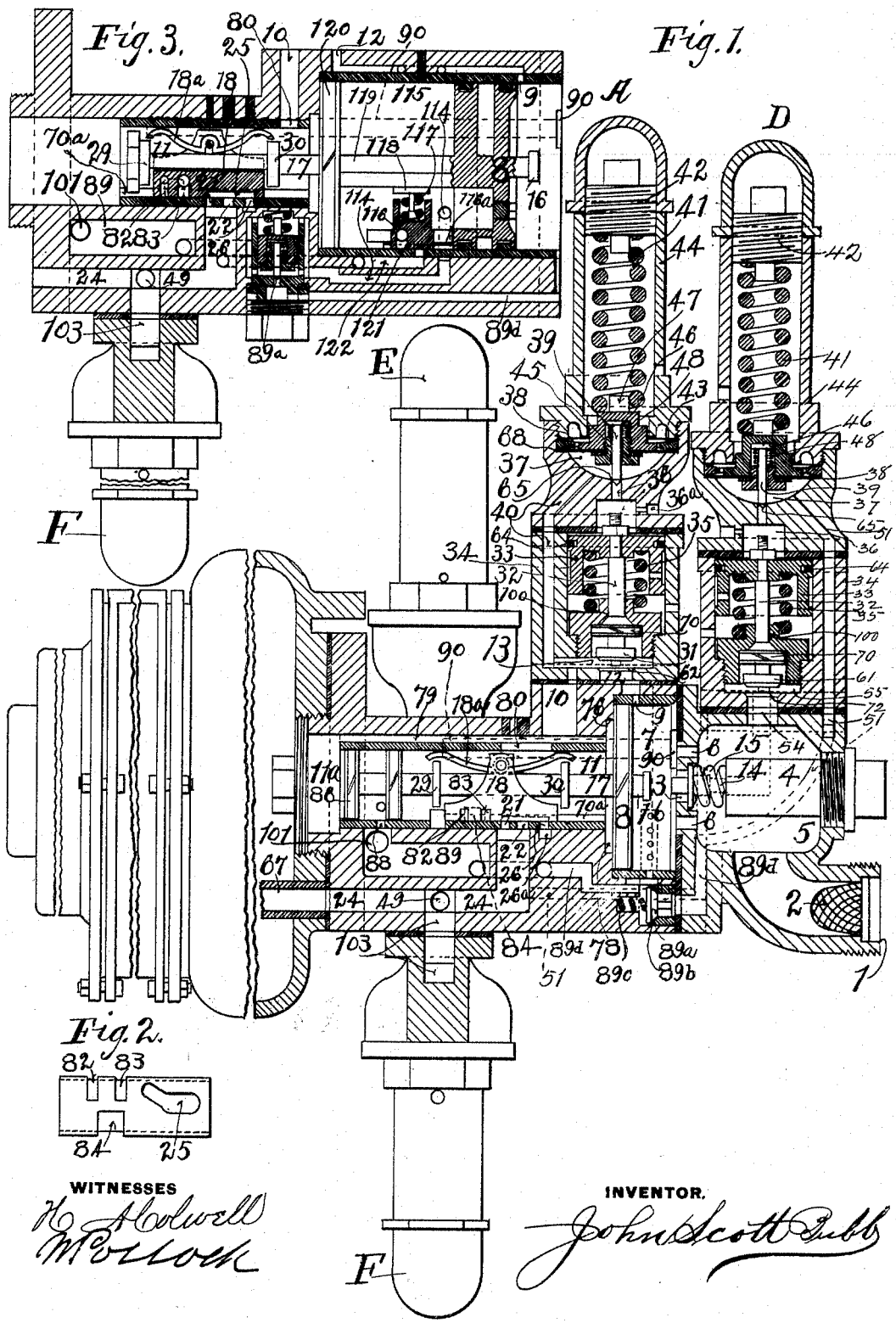

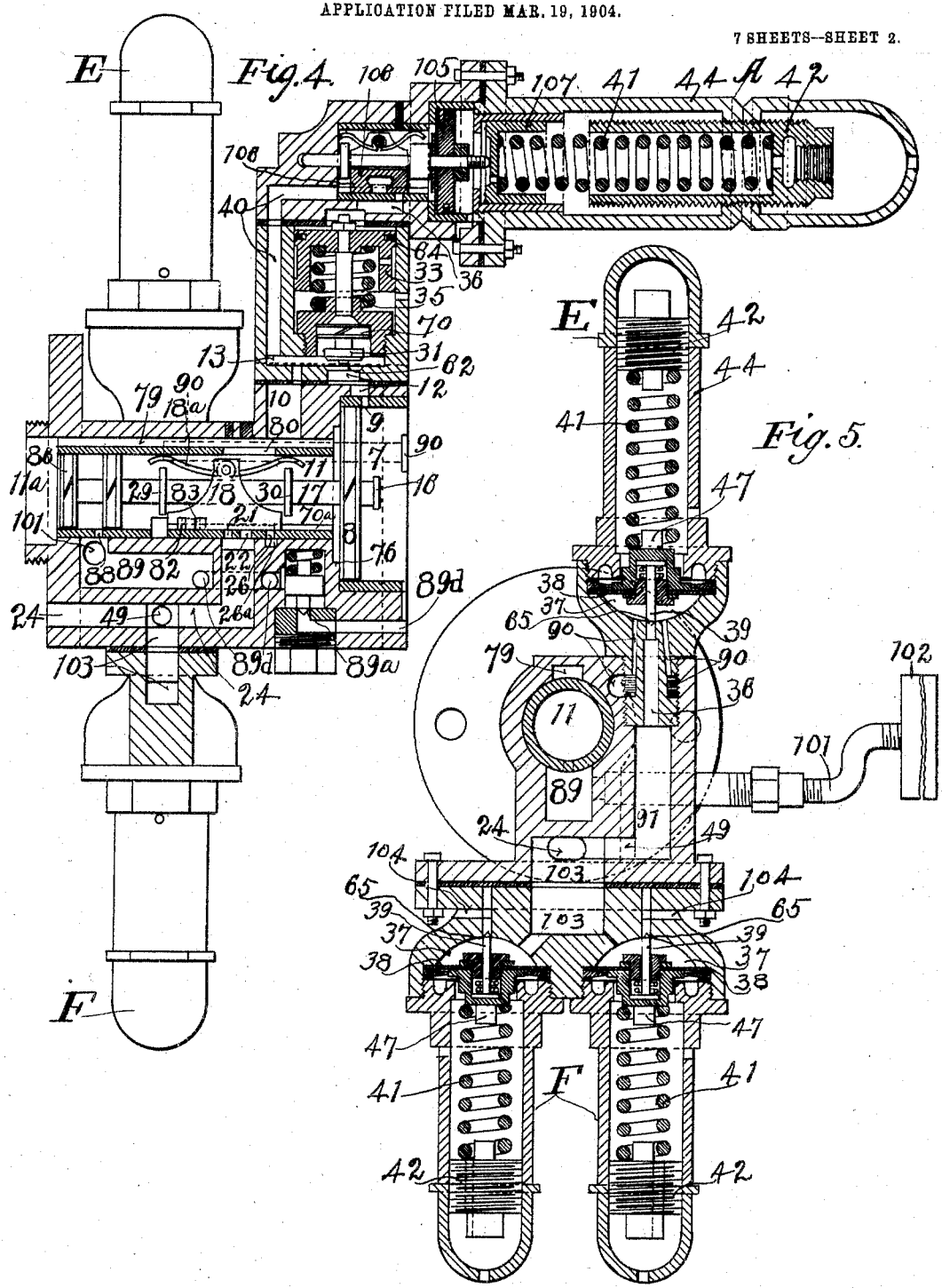

No. 783,774. PATENTED FEB. 28, 1905.
J. S. BUBB.
AUTOMATIC FLUID PRESSURE BRAKE SYSTEM.
APPLICATION FILED MAR. 19, 1904.
7 SHEETS—SHEET 3.
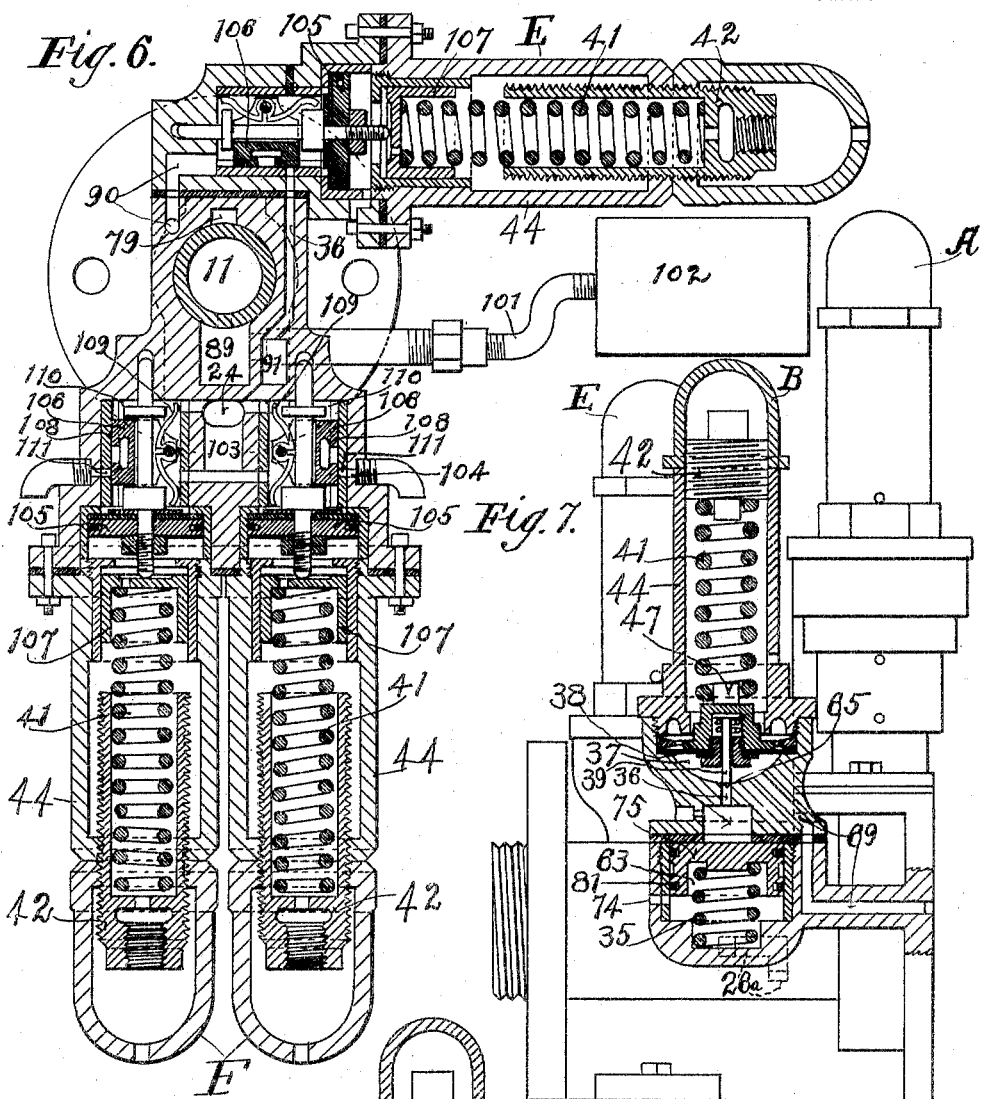
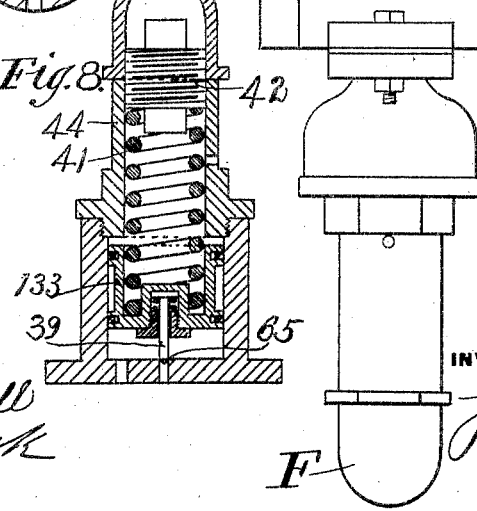
WITNESSES
INVENTOR
John Scott Bubb No. 783,774. PATENTED FEB. 28, 1905.
J. S. BUBB.
AUTOMATIC FLUID PRESSURE BRAKE SYSTEM.
APPLICATION FILED MAR. 19, 1904.
7 SHEETS—SHEET 4.
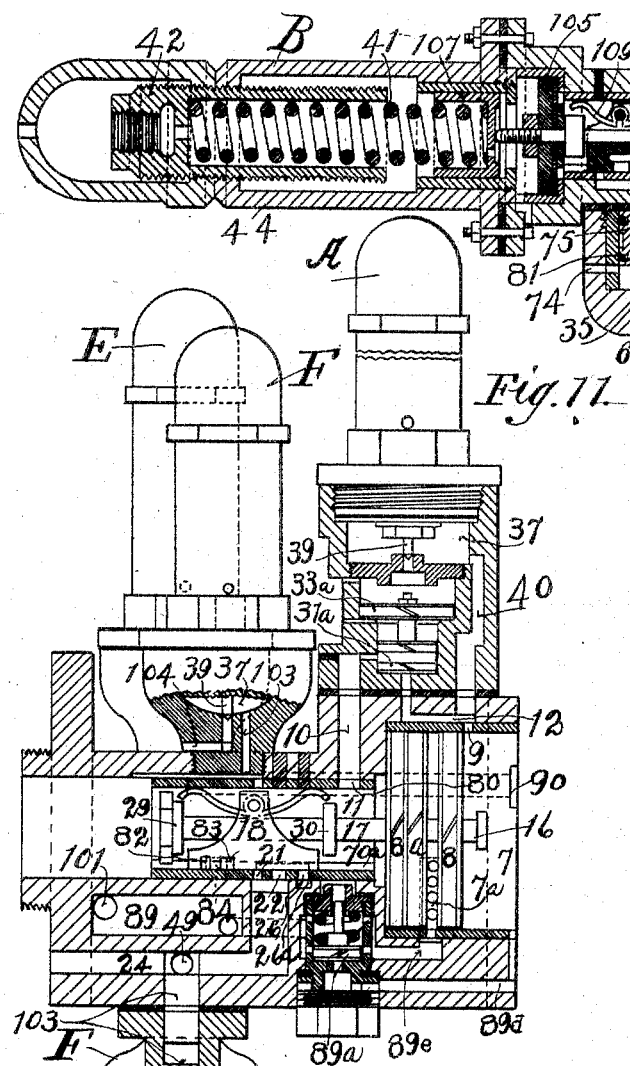
WITNESSES
INVENTOR
John Scott Bubb No. 783,774. PATENTED FEB. 28, 1905.
J. S. BUBB.
AUTOMATIC FLUID PRESSURE BRAKE SYSTEM.
APPLICATION FILED MAR. 19, 1904.
7 SHEETS—SHEET 5.
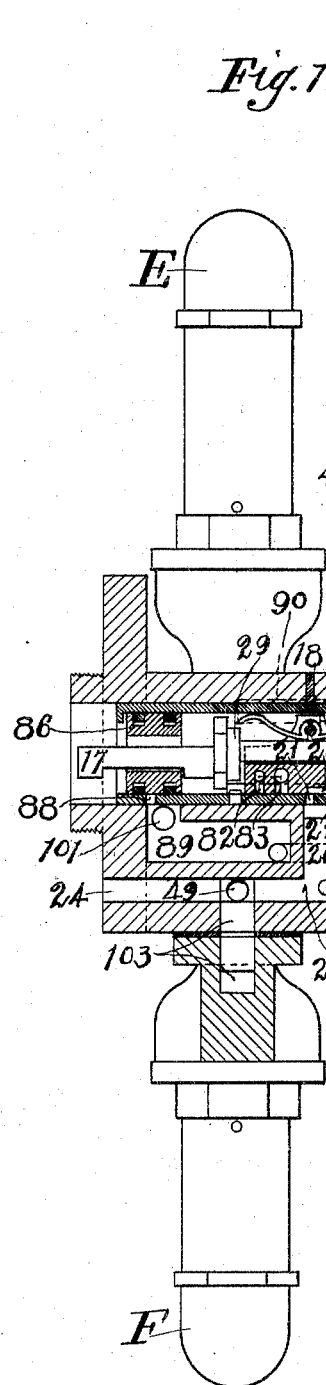

No. 783,774. PATENTED FEB. 28, 1905.
J. S. BUBB.
AUTOMATIC FLUID PRESSURE BRAKE SYSTEM.
APPLICATION FILED MAR. 19, 1904.
7 SHEETS—SHEET 6.
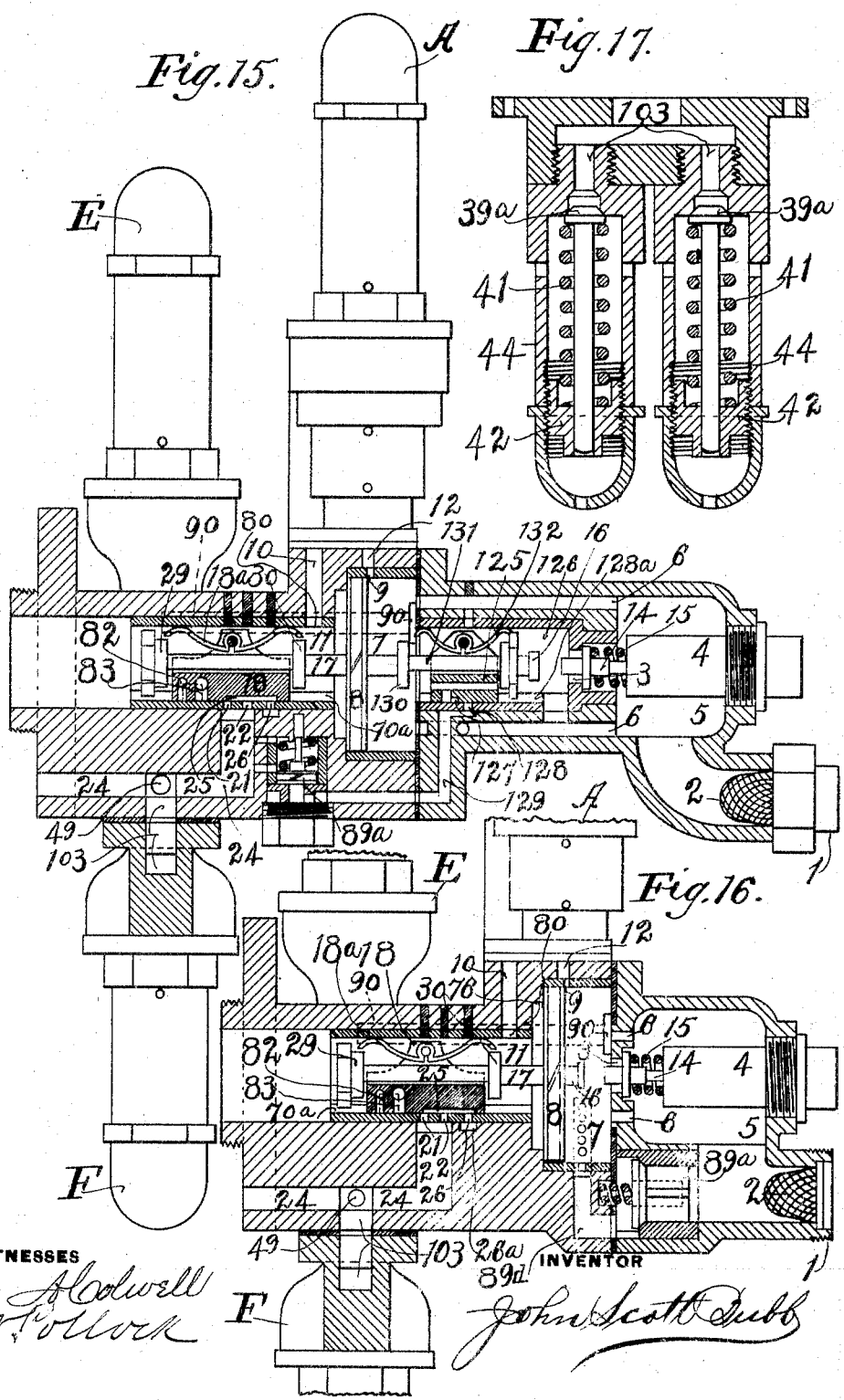

No. 783,774. PATENTED FEB. 28, 1905.
J. S. BUBB.
AUTOMATIC FLUID PRESSURE BRAKE SYSTEM.
APPLICATION FILED MAR. 19, 1904.

7 SHEETS—SHEET 7.

WITNESSES
INVENTOR
John Scott Bubb

No. 783,774. Patented February 28, 1905.

UNITED STATES PATENT OFFICE.

JOHN SCOTT BUBB, OF KITTANNING, PENNSYLVANIA.

AUTOMATIC FLUID-PRESSURE BRAKE SYSTEM.

SPECIFICATION forming part of Letters Patent No. 783,774, dated February 28, 1905.

Application filed March 19, 1904. Serial No. 198,934.

*To all whom it may concern:*

Be it known that I, JOHN SCOTT BUBB, a citizen of the United States, residing at Kittanning, in the county of Armstrong and State of Pennsylvania, have invented a new and useful Improvement in Quick-Action Automatic Fluid-Pressure Brake Systems, of which the following is a full, clear, and exact description.

My invention described herein relates to certain improvements in a quick-action automatic-governor fluid-pressure brake system and automatic-governor reducing-valve devices and automatic devices for emergency applications of the brake with fluid under pressure from the main train or brake pipe without resistance of pressure; and it has for its object certainty of quick action in an emergency application by a free flow of fluid under pressure through an always-open passage leading from the inner side of the driving-piston to the auxiliary reservoir, both when the automatic governor-valve A is open or closed and regardless of any amount of excess fluid under pressure in the main train or brake pipe, so adapted to be applied among other means through a porous piston-cylinder independent of any other piston or a flexible diaphragm when the driving-piston is shifted to an emergency position and the continuance of such emergency applications during any length of time desired or until the fluid under pressure is exhausted in the main train or brake pipe.

It is a further object of my invention to cause a graduated reduction of fluid under pressure in the brake-piston cylinder or in the passage leading thereto, such reduction being made during a high-pressure application, a service application, or an emergency application of the brakes.

It is a further object of my invention to provide a reserve quantity of fluid under pressure which shall be subject only to emergency applications of the brakes and by means of which a greater fluid-pressure may be applied to and maintained in the brake-piston cylinder than the fluid under pressure in the main train or brake pipe in an application of the brakes.

It is a further object of my invention to be enabled to use slide-valve means instead of pin-valve means in the automatic governor-valves in a brake-valve mechanism.

It is a further object of my invention to provide automatic means to hold the main service-valve subject to a service or emergency application of the brakes at all times operated by a reduction of fluid under pressure in the brake-pipe to cause the fluid to flow through an always-open passage into the main-service-valve chamber regardless of fluid under pressure in the main train or brake pipe.

It is a further object of my invention to be enabled to use piston means instead of flexible diaphragm in the automatic governor-valves in a brake-valve mechanism.

It is a further object of my invention to provide automatic operative valves on both sides of the driving-piston for emergency application of the brakes at the same time.

It is a further object of my invention to provide for automatic governing means to regulate to any point desired all that quantity of fluid under pressure in the main-service-valve chamber and auxiliary reservoir between the inner side of the driving-piston and the opposite end of the auxiliary reservoir so there will be at all times an equal pressure of fluid in both chambers (the main service-valve and the auxiliary reservoir) before and after the governing means is closed, regulating the fluid therein regardless of any excess of fluid under pressure in the main train or brake pipe, and to admit to atmosphere any excess fluid under pressure in the above chambers when excess fluid under pressure is in the main train or brake pipe.

It is a further object of my invention to provide automatic governor means to admit to atmosphere any excess of fluid under pressure in the main-service-valve chamber, auxiliary reservoir, and all passages communicating therewith when it reaches only a predetermined point of fluid under pressure in said chambers.

It is a further object of my invention to provide an emergency-port in the main service slide-valve adapted to admit a greater flow of fluid under pressure from the auxiliary reservoir, auxiliary emergency-reservoir, main train or brake pipe through the main-service-valve chamber into the reducing-valve and brake-piston cylinder when the driving-piston is shifted to an emergency position by a reduction of fluid under pressure in the main train or brake pipe.

It is a further object of my invention to provide automatic means to admit fluid under pressure in both ends of the main-service-valve chamber at the same time, thence into the brake-piston cylinder to cause an emergency application of the brakes, the means operated by a reduction of fluid under pressure in the main train or brake pipe.

It is a further object of my invention to provide automatic governing means adapted to govern the fluid under pressure in the main-service-valve chamber and auxiliary reservoir so it is under equal pressure at the same time when there is an excess of fluid under pressure in the main train or brake pipe.

It is a further object of my invention to provide automatic governing means to vent to atmosphere any excess of fluid under pressure above the normal in the main-service-valve chamber and auxiliary reservoir that may leak past the driving-piston during the time the fluid is governed in said chambers when an excess of fluid under pressure is established in the main train or brake pipe.

It is a further object of my invention to provide a porous driving-piston cylinder so adapted to admit fluid directly from the main train or brake pipe through the pores into the brake piston cylinder only when the driving-piston is shifted to an emergency position.

It is a further object of my invention to provide automatic means to admit a small quantity of fluid under pressure directly from the main train or brake pipe to the brake-piston cylinder during the time of a service application of the brakes.

It is a further object of my invention to provide automatic means so I am enabled to make a quick-action application of the brakes by a reduction of fluid under pressure in the main train or brake pipe after an automatic governor-valve is closed, controlling all that quantity of fluid under pressure in the main-service-valve chamber and auxiliary reservoir, to be equal at the same time in both chambers, the flow of fluid under pressure passing through an always-open passage between the main-service-valve chamber and the auxiliary reservoir, pressing against the inner face of the driving-piston, and so shifting the same to either a service or emergency position.

It is a further object of my invention to provide an automatic governor to govern to any predetermined point desired all that quantity of fluid under pressure both in the main-service-valve chamber and auxiliary reservoir and also through an always-open passage between the two chambers so the fluid under pressure will be equal at all times, pressing against the inner side of the driving-piston, main-service-valve chamber, and the auxiliary reservoir, regardless of any excess of fluid under pressure in the main train or brake pipe.

It is a further object of my invention to provide automatic regulating means to regulate or stop the driving-piston when it is being shifted by fluid under pressure to cause only a service application of the brakes and also to not shift an emergency-valve to make an emergency application when only a service application of the brakes is desired.

Is is a further object of my invention to provide automatic governing means to control to any point of fluid under pressure desired in the chambers and passages before or during the time of an application of the brakes, all that quantity of fluid under pressure in the said chambers and passages being in communication with the inner side of the driving-piston that operates the main service slide-valve when an excess amount of fluid under pressure is in the main train or brake pipe.

It is a further object of my invention to provide vent-ports communicating the chambers in the mechanism with the atmosphere, that contain operative means therein which are necessary to be vented to atmosphere for the automatic operation of the same on each car or vehicle.

It is a further object of my invention to provide automatic governing means to cut off the flow of fluid under pressure flowing into chambers and passages, being always in communication with the inner face of the driving-piston in the main-service-valve device when the fluid in the main-service-valve chamber or main train or brake pipe has reached any predetermined point of fluid under pressure desired on each car or vehicle.

It is a further object of my invention to provide automatic means on each car or vehicle that will enable the engineer to control the fluid under pressure so it is equal in all chambers and passages in the air-brake mechanism in communication with the inner side of the driving-piston when he has an excess of fluid under pressure in the main train or brake pipe before or during an application of the brakes.

It is a further object of my invention to provide automatic governing means to control all that quantity of fluid under pressure at the same time to any predetermined point desired above the normal fluid under pressure in the main train or brake pipe in all chambers and passages in the air-brake mechanism communicating with the inner face of the driving-piston, which being adapted to operate the main service slide-valve so the fluid under pressure in such chambers and passages will be equal at all times when an excess of fluid under pressure is in the main train or brake pipe on each car or vehicle before or during an application of the brakes.

It is a further object of my invention to provide means in an automatic-governor air-brake valve that will permit the pin-valve to be loosely connected, so it will vibrate in closing the seat-port in the supplemental automatic-governor-valve devices on each car or vehicle.

It is a further object of my invention to provide for an emergency application of the brakes without resistance of fluid under pressure acting against the emergency-valve.

It is a further object of my invention to provide for an emergency application of the brakes which may follow a service application by a still greater reduction of fluid under pressure in the main train or brake pipe.

It is a further object of my invention to provide for certain modifications in the automatic governor-valves whereby more perfect action and simplicity of construction may be secured.

It is a further object of my invention to provide for certain modifications in the automatic governor-valve for regulating the pressure in the main-service-valve chamber, said governor-valve being adapted to be so operated by main train or brake pipe pressure that when the pressure in the main-service-valve chamber is equal to normal main train or brake pipe pressure the pressure in the main train or brake pipe may be increased above normal pressure and reduced to normal pressure without affecting the main service-valve, the main service-valve being held normally closed, subject to a quick action of the brakes by a reduction of fluid under pressure in the main train or brake pipe.

It is a further object of my invention to provide a valve adapted to be opened by a reduction of pressure in the main train or brake pipe and to admit fluid under pressure from the main train or brake pipe to the brake-piston cylinder without resistance continuously for any length of time desired.

It is a further object of my invention to provide an auxiliary emergency-reservoir from which fluid under pressure in the auxiliary emergency-reservoir may be admitted to the brake-piston cylinder during the time of an application of the brakes.

It is a further object of my invention to provide a flexible-diaphragm governor-valve in which the reinforcing-ring is provided with a taper to permit of a spherical or central movement of the flexible diaphragm by fluid under pressure.

It is a further object of my invention to provide automatic governor means operated by fluid under pressure at or above normal, either from the main-service-valve chamber or the main train or brake pipe to control the fluid under pressure in the main-service-valve chamber to any predetermined point of fluid under pressure desired, with open passages at all times between the main-service-valve piston and the auxiliary reservoir, so that a quick flow of fluid under pressure in the main-service-valve chamber and auxiliary reservoir may shift the main service-valve to cause a quick application of the brakes.

It is a further object of my invention to provide open passage at all times between the main-service-valve piston and the auxiliary reservoir after the fluid under pressure in the main train or brake pipe has been cut off from passing through the passages into the main-service-valve chamber and auxiliary reservoir. The automatic governor means to cut off the flow of such fluid under pressure in said passages is operated by fluid under pressure at or above normal pressure, either from the main-service-valve chamber or the main train or brake pipe.

It is a further object of my invention to provide automatic means to admit a flow of fluid under pressure from the main train or brake pipe to the brake-piston cylinder during a service application of the brakes.

It is a further object of my invention to provide automatic governing means so adapted to be operated by fluid under pressure at or above normal either from the main-service-valve chamber or main train or brake pipe when said fluid under pressure reaches a predetermined point either in the main-service-valve chamber or the main train or brake pipe to close a passage between the main train or brake pipe and the main-service-valve chamber, permitting an excess of fluid under pressure desired in the main train or brake pipe above the normal and retaining open passages at all times between the driving-piston of the main service-valve and the auxiliary reservoir. While such excess of fluid under pressure is in the main train or brake pipe the passages are unobstructed between the said piston and auxiliary reservoir. Such arrangements of automatic governing means is so that a quick application of the brakes may be had at any time by a reduction of fluid under pressure in the main train or brake pipe regardless of any excess of fluid in the main train or brake pipe at the time of such application of the brakes.

I will now describe my invention, so that others skilled in the art may manufacture and use the same, reference being had to the accompanying drawings, forming part of this specification, in which—

Figure 19:
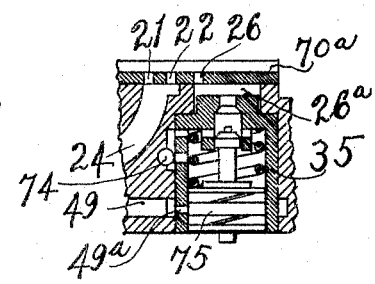

Figure 1 is a longitudinal section, partly in elevation, of the main automatic-governor fluid-under-pressure brake-valve chest or casing, with an always-open passage between the auxiliary reservoir and the inner face of the driving-piston and automatic-governor-valve mechanism A, showing the automatic duplex governor or reducing valve F partly in elevation and the automatic governor-valve E in elevation. Fig. 2 is a plan view of the main service slide-valve. Fig. 3 is a modification of the devices shown in Fig. 1. Fig. 4 is a longitudinal section of the main chest or casing of the automatic-governor fluid-under-pressure brake-valve device, with an always-open passage between the auxiliary reservoir and the inner face of the driving-piston and automatic-governor-valve mechanism A, showing a modified automatic-governor-valve mechanism A and the automatic duplex governor-valve F and the automatic governor-valve E in elevation. Fig. 5 is a transverse section on a line of the governor-valves E and F of Fig. 1, showing the duplex governor or reducing valve F and the automatic governor-valve E in section, with the auxiliary emergency-reservoir attached in elevation. Fig. 6 is a transverse sectional view of a modified form of the main chest or casing of the automatic-governor fluid-under-pressure brake-valve device provided with a modified automatic-governor-valve mechanism E, with the auxiliary emergency-reservoir attached in elevation, also a modification of the automatic governor-valve F. Fig. 7 is a longitudinal view of the main chest or casing of the automatic-governor fluid-under-pressure brake-valve device, partly in section and partly in elevation, showing the automatic-governor retaining-valve mechanism B in section and also the automatic duplex governor reducing-valve F in elevation, also an automatic governor-valve A and E in elevation. Fig. 8 is a sectional view of a modified form of the automatic-governor-valve device. Fig. 9 is a transverse section of the main chest or casing of the automatic-governor fluid-under-pressure brake-valve device, showing a modified automatic-governor retaining-valve mechanism B in section, and the modified automatic duplex governor reducing-valve F in elevation, also the automatic-governor-valve mechanism E in elevation. Fig. 10 is a sectional view of a modified automatic-governing-valve device. Fig. 11 is a modification of the devices shown in Fig. 1 with the valve-chamber of the automatic governor-valve F normally in communication with the main-service-valve chamber and auxiliary reservoir. Fig. 12 is a modification of the automatic-governor-fluid-pressure brake system adapted to be operated by only a slight reduction of fluid under pressure in the main train or brake pipe, and a further reduction will cause an emergency application of the brakes through emergency-valves on both sides of the main service-valve, said valves being operated by the driving-piston, with an always-open passage between the auxiliary reservoir and the inner face of the driving-piston and the automatic governor-valve mechanism A, also showing a modified sectional and elevation view of the automatic-governor-valve device A, also the automatic-governor-valve device E in elevation and the automatic duplex governor reducing-valve mechanism F partly in elevation. Fig. 13 is a further modification of the devices shown in Fig. 1, with an always-open passage between the auxiliary reservoir and the inner face of the driving-piston and the automatic-governor-valve mechanism A. Fig. 14 is a modification of the retaining-valve mechanism B, shown in Figs. 1, 4, 5, 6, 7, 9, 11, 12, and 13, the automatic governor-valve E, being removed, while the functions are operative with those of B and formed in the casting directly over the main-service-valve chamber or any other suitable place. Fig. 15 is a modification of the automatic-governor fluid-pressure brake-valve device adapted, with duplex means on both sides of the driving-piston, to make a service and emergency application of the brake simultaneously without any resistance of fluid under pressure in the air-brake system, with an always-open passage between the auxiliary reservoir and the inner face of the driving-piston and automatic-governor-valve mechanism A, also with the modified automatic governor-valve A in elevation and automatic governor-valve E in elevation and the automatic duplex governor leakage valve F partly in elevation. Fig. 16 is a modification of the devices shown in Fig. 1, with an always-open passage between the auxiliary reservoir and the inner face of the driving-piston and the automatic-governor-valve mechanism A, showing automatic governor-valve A and E in elevation, partly broken away, the automatic governor-valve F, partly in section and partly in elevation, broken away, and also showing the non-return check-valve 89$^a$ longitudinally in the chest or casing forming the chamber 5. Fig. 17 is a modification of the duplex leakage device similar to the duplex automatic-governor-leakage-valve mechanism F, substituting a valve 39$^a$ for a flexible diaphragm and pin-valve, the valve being held to its seat by the tension of a spring under a predetermined point of pressure. Fig. 18 is a modification of Figs. 1, 4, 5, 6, 7, 9, 11, 12, 13, 14, 15, and 16. The automatic-governor-retaining-valve mechanism B is placed on the under side of the main-service-valve chamber instead of on the upper side, as shown in Fig. 14. Also the automatic-governor-valve mechanism A is formed in the casting which forms the chamber 5. It also shows that after the retaining-valve closes the exhaust-passage leading from the brake-piston cylinder to the atmosphere, operated by an excess of fluid-pressure in the main train or brake pipe, the said excess fluid-pressure in the main train or brake pipe will flow through the retaining-valve chamber to the duplex-leakage-valve chamber and thence to the brake-piston cylinder, perpetuating an application of the brakes. Fig. 19 is a modification of the retaining-valve 75, as shown in Fig. 18.

The tension of the spring 35 is under a predetermined point of pressure. This pressure added to the back fluid-pressure from the brake-piston cylinder makes a resistance of pressure a little less than the fluid-pressure from the main train or brake pipe, which fluid-pressure operates a device to close the retaining-valve 75. Thus the fluid-pressure in the brake-piston cylinder may be increased or decreased at the will of the engineer by simply increasing or decreasing the fluid under pressure in the main train or brake pipe above the normal, because the fluid-pressure in the main train or brake pipe flows into the brake-piston cylinder after the retaining-valve is closed, while the main-service-valve chamber is cut off from the main train or brake pipe, the fluid-pressure being regulated in the main-service-valve chamber, the pressure being greater than that in the brake-piston cylinder while an application of the brakes is being perpetuated for any length of time desired.

My invention consists in a quick-action fluid-under-pressure brake system having a brake-piston cylinder, a main train or brake pipe, an auxiliary reservoir, a main service-valve, and one or more automatic governor-valves, of an auxiliary emergency-reservoir adapted to reserve a quantity of fluid under pressure which shall be subject only to emergency applications of the brakes, of devices for causing an emergency application of the brakes to be made without any resistance to the movement of the valve from fluid under pressure, of devices for causing an emergency application of the brakes to increase the pressure in the brake-piston cylinder as a continuance of a service application, of modifications of several parts whereby more perfect action and simplicity of construction is secured, of devices for causing a graduated reduction of pressure in the brake-piston cylinder or in the passage leading thereto, such reduction being made during a high-pressure application, a service application, or an emergency application, of an automatic governor-valve for regulating to any point desired all that fluid under pressure at all times that passes through a passage leading from the piston-cylinder into the automatic-governor-valve chamber, main-service-valve chamber, auxiliary reservoir, and all other chambers or passages being normally open regardless of any excess of fluid under pressure in the main train or brake pipe, and to admit to atmosphere from the said chambers and passages any fluid under pressure that may leak by the piston into the chambers when an excess of fluid under pressure is in the main train or brake pipe, the main-service-valve piston being held so adapted to make a quick application of the brakes at all times by all the flow of fluid under pressure against the inner side of the driving-piston through an always-open passage between the said piston and the auxiliary reservoir, said automatic governor-valve being adapted to be operated by fluid under pressure from the main train or brake pipe or fluid under pressure in the main-service-valve chamber.

In order to reduce the pressure on the brakes as the speed of the train is checked, I employ an automatic duplex governor brake-valve or leakage device, which permits the pressure to gradually leak out of the passages and chambers of the main automatic-governor fluid-under-pressure brake-valve during an application of the brakes and from the source of supply leading to the brake-piston cylinder when a high-speed application is made, and thus gradually reduce the fluid under pressure exerted on the brake-shoe. By means of this automatic duplex governor-valve an excess fluid under pressure may be applied to the brakes at the first application, which fluid under pressure becomes gradually reduced through leakage as the train comes to a standstill. This automatic duplex governor-valve is shown in section in Figs. 5 and 6. The essential features of this automatic governor-valve are a piston or flexible diaphragm situate in a passage leading from the main service-valve and auxiliary reservoir, auxiliary emergency-reservoir, main train or brake pipe to the brake-piston cylinder. Attached to the flexible diaphragm or piston is a valve normally held closed by an automatic governor-spring, which exerts its force against the flexible diaphragm or piston and which may be adjusted to any desired tension of pressure. When the fluid under pressure in the main-service-valve chamber, auxiliary reservoir, auxiliary emergency-reservoir, and in the passages leading to the brake-piston cylinder is greater than the pressure of the governor-spring, the valve is opened, allowing the excess fluid under pressure to leak into atmosphere until this pressure is reduced to a point below the pressure of the tension of the automatic governor-spring. Thereupon the valve is closed, and leakage from the main-service-valve chamber, auxiliary reservoir, auxiliary emergency-reservoir, main train or brake pipe, and brake-piston cylinder ceases. By making this automatic governor-valve in duplex form having two valves and two automatic governor-springs of unequal tension half the leakage can be shut off when the pressure has been reduced to a certain predetermined point, thereby reducing the rate of leakage from the main-service-valve chamber, auxiliary reservoir, auxiliary emergency-reservoir, main train or brake pipe, and brake-piston cylinder one-half.

In my improved quick-action automatic-governor fluid-pressure brake and reducing-valve system the main service slide-valve is shown in section in Fig. 1. In the drawings, 1 represents the main train or brake pipe; 2, a screen at the mouth thereof; 5, a main train or brake pipe chamber, and 6 ports leading from the main train or brake pipe chamber into the main-service-valve piston porous or non-porous cylinder 7. In this piston-cylinder is a piston 8, adapted to be reciprocated by difference of pressure on opposite sides of the piston. The pores in the piston-cylinder are adapted to admit the flow of fluid under pressure from the main train or brake pipe directly to the brake-piston cylinder independent of any other piston or a flexible diaphragm through the piston-cylinder 7 and main-service-valve chamber 11 into a passage leading to the brake-piston cylinder by a reduction of fluid under pressure in the main train or brake pipe sufficiently to cause an emergency application of the brakes, the piston 8 being shifted its full movement in the porous piston-cylinder by fluid under pressure from the main-service-valve chamber and auxiliary reservoir. On the farther side of the piston 8 is a fluid-pressure chamber 78, the purpose of which is to allow such a fixed area of fluid under pressure on the rear face of the piston as will when added to the fluid-pressure area found on the rear face of the piston 86 at the other end of the piston-rod approximately equal the pressure-surface of the front face of the piston 8 in the chamber 7. Beyond the chamber 78 is a valve-chamber 11, in which is the main service slide-valve 18, held to its seat $70^a$ by a spring $18^a$. This slide-valve is provided with ports 82, 83, and 84 and adapted to register with ports 21 and 22. The ports 21 and 22 are service and emergency ports, respectively leading to the passage 24, which connects with a passage 103, leading to the automatic duplex governor or leakage device and thence to a passage 67, that leads to the brake-piston cylinder. The port 26 leads to the exhaust-passage $26^a$. Secured to the piston-rod 17 are the collars 29 and 30, which collars are adapted to strike against the slide-valve 18 and move it back and forth on its seat $70^a$, so as to open and close the ports 21 and 22 and establish communication by these ports between the main-service-valve chamber and auxiliary reservoir, reducing-valve chamber, and the brake-piston cylinder for the purpose of making a service and emergency application of the brakes. The passage which leads from the main train or brake pipe to the main-service-valve chamber is provided with an automatic-governor-valve device A and is so adapted to govern all that quantity of fluid under pressure in the main-service-valve chamber, auxiliary reservoir, and passages connecting therewith that the fluid is under equal pressure in both chambers and passages at the same time, pressing against the inner face of the driving-piston so that the automatic-retaining-valve device may be operated without affecting the main-service-valve mechanism, the purpose of which is to shut off communication between the main train or brake pipe and the main-service-valve chamber as soon as the fluid in the main-service-valve chamber has reached a predetermined pressure and to admit to atmosphere any fluid under pressure in the main-service-valve chamber above the normal fluid under pressure in said chamber and auxiliary reservoir to prevent the accumulation of any excess of fluid under pressure in the main-service-valve chamber by leaking past the driving-piston 8 when the main train or brake pipe is charged with excess of fluid under pressure above the normal.

When the driving-piston 8 and the main-service-slide-valve mechanism operated thereby are in normal position to the left, the driving-piston 8 being forced to its seat 76 by the fluid under pressure from the main train or brake pipe and the main-service slide-valve cutting off communication between the main-service-valve chamber, reducing valve-chamber, the auxiliary reservoir, and the brake-piston cylinder, the fluid will pass from the driving-piston cylinder 7 through the port 9 and passage 12 into the automatic-governor-valve chamber 13 of the governor-valve 31 and thence by the passage 10 and the by-pass 79 through the port 80 into the main-service-valve chamber 11 and auxiliary reservoir $11^a$. As soon as a predetermined fluid-pressure has been attained in the main-service-valve chamber and the connecting-passages above described and also in the passage 40 and the flexible diaphragm-chamber 37 of the automatic-governor-valve mechanism A the fluid under pressure from said passages and chambers will raise the flexible diaphragm 38, and with it the governor pin-valve 39 and from its seat 65, and thereby permit fluid under pressure to flow from the flexible diaphragm-chamber 37 into the passage 36 and thence into the automatic-governor-piston cylinder 34, where such fluid under pressure will operate upon the automatic governor-piston 33 and force the automatic governor-valve 31 down on its seat 62, closing the passage 12 and preventing any further flow of fluid under pressure from the main train or brake pipe 1 through the driving-piston cylinder 7 to the main-service-valve chamber and auxiliary reservoir. A leakage-port $36^a$ leads from passage 36. This port has a double function: First, it allows of the opening of the valve 31 by permitting the escape to atmosphere of fluid under pressure in rear of the piston of the valve, and, secondly, it allows the escape of any excess of fluid under pressure which may leak into the main-service-valve chamber from the main train or brake pipe when fluid under pressure in the main train or brake pipe is greater than the fluid under pressure in the main-service-valve chamber, thus preventing any excess of fluid under pressure in the main-service-valve chamber and the auxiliary reservoir. The valve 31 is connected to a stem 32, having a packing-ring 70, said stem moving through a bore or guideway 100 and carrying an automatic governor-piston 33 and provided with suitable packing-rings 64 and arranged within an automatic-governor-piston cylinder 34. The valve 31 of the governor is normally held away from its seat 62 by a spring 35, which is interposed between the automatic-governor-piston and the end of the automatic-governor-piston cylinder. The head of the power end of the cylinder 34 of this automatic-governor-valve mechanism is recessed, forming a cylinder for the reception of the packing-piston 70, which is adapted to prevent the loss or flow of fluid under pressure from the main-service-valve chamber and passages in the chest or casing of the mechanism when such pressure is at or below the normal. The upper end of this automatic-governor-piston cylinder 34 communicates by a passage 36 with the flexible diaphragm-chamber 37, said chamber having a flexible diaphragm 38, carrying in a manner hereinafter described the automatic governor pin-valve 39. The flexible-diaphragm chamber 37 is connected by a passage 40 with the main-service-valve chamber or passages leading thereto, so that the fluid under pressure in the main-service-valve chamber may flow into the flexible-diaphragm chamber 37. This automatic governor pin-valve 39, which is carried in the center of the disk hub 47 and in the center of the flexible diaphragm, is normally held to its seat 65 by an automatic-governor-regulating spring 41, which bears against the disk hub and has its tension so adjusted by a screw-plug 42 in the opposite end of the automatic-governor-spring chamber 44 as to hold the automatic governor pin-valve against its seat 65 until a certain predetermined fluid under pressure—say seventy pounds—has been attained in the main-service-valve chamber. When such fluid under pressure has been attained, it overcomes the tension of the automatic governor-spring 41 by the fluid under pressure against the flexible diaphragm, and by lifting the valve 39 from its seat 65 fluid under pressure is allowed to pass under seventy pounds of fluid under pressure against the piston 33, which will close the valve 31 and shut off the flow of fluid under pressure from the main train or brake pipe through the port 9 and passage 12 into automatic-governor-valve chamber 13 and passages 10, 80, and 79 from passing through the main-service-valve chamber to the auxiliary reservoir 11ᵃ until the fluid under pressure in the main-service-valve chamber may have been reduced below the predetermined amount of seventy pounds or normal main train or brake pipe pressure. When the fluid under pressure has been so reduced, the automatic governor-spring 41 will again close the valve 39, and the fluid under pressure being removed from the piston 33 the spring 35, with the fluid under pressure against the valve 31 from the main train or brake pipe, will raise the piston and again open the valve 31, which will remain open until the fluid under pressure in the valve-chamber is at normal fluid under pressure. As soon as this fluid under pressure in the main-service-valve chamber and passages connected therewith is at normal the valve 31 closes and prevents any excess fluid-pressure above normal or any reduction of this excess pressure from a point above normal down to normal main train or brake pipe pressure from operating the main service-valve and making an application of the brakes. As shown in Fig. 1, the edges of the flexible diaphragm 38 are clamped under an inward spherical taper ring 43 between shoulders on the walls 68 of the fluid-chamber 37, which is formed at the base of the automatic-governor-spring chamber 44. The spherical taper ring is so adapted to admit of a spherical or central movement of the flexible diaphragm when fluid under pressure is exerted against the lower side of the flexible diaphragm to open a valve. The automatic governor pin-valve 39 passes loosely through a thimble-nut 45, the latter having a threaded stem, passes up through the center of the flexible diaphragm, and screws into the center of the disk hub 47, which disk hub is guided in its movements up and down by the sides of the automatic-governor-spring chamber 44 and the spherical taper ring 43. The upper end of the automatic governor pin-valve 39 is provided with a head 46, arranged in a disk hub 47, and is held by a spring 48 against the upper end of the recess. By this construction wear will be compensated for and the automatic governor pin-valve 39 will be allowed to accommodate itself to its seat 65, tightly closing the upper end of the passage 36. For general purposes and convenience of description I designate this apparatus as the "automatic-governor-valve mechanism" A.

The operation of the automatic-governor-valve mechanism A will be readily understood from the foregoing description of the parts, as it governs all that quantity of fluid under pressure in both the auxiliary reservoir and main-service-valve chamber pressing against the inner side of the driving-piston 8, so that it does not have a greater pressure than that of the fluid in the main train or brake pipe when it is under normal pressure, as these automatic governing means will permit any excess of fluid desired in the main train or brake pipe to be used to make a straight fluid-under-pressure application of the brakes and also close the automatic retaining-valve devices to perpetuate an application of the brakes by closing the exhaust-passage from the brake-piston cylinder, thus preventing any multiple application of the brakes when the fluid under pressure in the main train or brake pipe is reduced from a point above normal down to normal, because at no time will the fluid under pressure pressing against the inner side of the driving-piston 8 become any greater than the normal fluid under pressure in the main train or brake pipe. It will be further understood that if it were not for such automatic governing means the fluid under pressure in the main-service-valve chamber pressing against the inner side of the piston would be under the same pressure as that of the main train or brake pipe, and consequently each reduction of fluid under pressure in the main train or brake pipe would shift the driving-piston 8 and make an application of the brakes.

The main-service-valve chamber and the auxiliary reservoir having been charged in the manner stated, service application of the brakes may be effected by a reduction of fluid under pressure in the main train or brake pipe and driving-piston cylinder 7 to a degree less than the fluid under pressure in the main-service-valve chamber and the auxiliary reservoir, for as soon as the fluid under pressure in the main-service-valve chamber pressing against the inner face of the main-service-valve driving-piston 8 and in the auxiliary reservoir is greater than the fluid under pressure in the main train or brake pipe which presses against inner face of the driving-piston 8 the fluid under pressure from the main-service-valve chamber and the auxiliary reservoir will force the driving-piston 8 from its seat 76, or slightly to the right or to a service position, thus closing the port 9, which communicates with the automatic-governor-valve mechanism A and the main-service-valve chamber, thus preventing any further flow of fluid under pressure from the main train or brake pipe into the main-service-valve chamber and auxiliary reservoir. This movement of the piston 8 also opens communication between the main-service-valve chamber, auxiliary reservoir, reducing-valve chamber, and the brake-piston cylinder as follows, the stem 17 of the driving-piston 8 being provided with shoulders 29 and 30, which are adapted to strike against opposite ends of the main service slide-valve 18. The chamber or cylinder 11 is made cylindrical, except the front end portions of its lower side, where a flat seat 70ª is formed for the travel of the main service slide-valve 18. Through this flat seat 70ª are formed ports 21, 22, and 26, the ports 21 and 22 connecting with the passage 24, leading to the automatic duplex governor or leakage device and also leading to or communicating with the brake-piston cylinder passage or pipe 67, as shown in Figs. 1, 3, 4, 5, 6, 11, 12, 13, 14, and 15 and as has already been described. The main service slide-valve 18 is provided with ports or recesses 82, 83, and 84, which when the valve is in proper position on its seat in the valve-chamber 11 will allow fluid under pressure to flow from the main-service-valve chamber, the automatic-governor-valve chamber, and the auxiliary reservoir for a service application and in an emergency application of the brakes from the main train or brake pipe through passage 89ᵈ, chamber containing non-return check-valve 89ª, storage-chamber 89, auxiliary emergency-reservoir, and port 88, leading to the auxiliary reservoir and into passages leading to the brake-piston cylinder, also through the porous piston-cylinder 7 when the driving-piston 8 is in an emergency position, being shifted by a reduction of fluid under pressure in the main train or brake pipe to a point below the fluid under pressure in the main-service-valve chamber and the auxiliary reservoir, and the movement of the piston 8, as already described, the shoulder 29 on the driving-piston stem 17 will strike against the main service slide-valve 18, and so shift the latter as to bring its port 83 into alinement with the port 21, thus permitting the fluid under pressure from the main-service-valve chamber and the auxiliary reservoir (which fluid under pressure passes into the main-service-valve chamber 11 through the passage 79 and the port 80) or directly through the valve-chamber to flow through the passage 24 into the reducing-valve chamber and the pipe or passage 67 to the brake-piston cylinder, and thereby effect an ordinary or service application of the brakes. After the fluid under pressure has been applied to the brake-piston cylinder in the manner described the brakes are held applied by the same fluid under pressure from the main-service-valve chamber and the auxiliary reservoir in the brake-piston cylinder. When it is desired to release the brakes, the fluid under pressure in the main train or brake pipe is restored to a little above normal—that is, a little above seventy pounds fluid-pressure. This increase in fluid under pressure acting on the main-service-valve driving-piston 8 retracts the main service slide-valve 18, cutting off the flow of fluid under pressure from the main-service-valve chamber and the auxiliary reservoir through the passages to the reducing-valve chamber and to the brake-piston cylinder by closing the ports 21 and 22, and at the same time the exhaust-port 26 is opened. This port 26 communicates with a recess 25 in the bottom of the main service-valve 18, and it serves to connect the passage 24 (which communicates with the brake-piston cylinder and establishes an exhaust therefrom) with the port 26, which leads to the atmosphere through passage 26ª and chambers which will hereinafter be described. This permits the fluid under pressure to escape to atmosphere from the brake-piston cylinder. When, however, it is desirable to shut in or retain the fluid under pressure in the brake-piston cylinder, perpetuating an application of the brakes which has passed to the brake-piston cylinder in the manner just described, it is customary to close what is known as a "retaining-valve," being closed and opened by a brakeman, in order to keep or retain fluid under pressure in the brake-piston cylinder, perpetuating an application of the brakes while the auxiliary reservoir is being charged with fluid under pressure from the main train or brake pipe. The retaining of fluid under pressure in the brake-piston cylinder I am enabled to do automatically by excess fluid under pressure above the normal in the main train or brake pipe from any available source, preferably, however, directly from the main train or brake pipe in the manner herein described, and I accomplish this object by placing in connection with the main train or brake pipe or other source of supply as to be capable of being acted on by an excess of fluid under pressure above the normal in the main train or brake pipe which serves to close the exhaust-passage $26^a$ from the brake-piston cylinder to atmosphere. Leading from the passage 25 in the bottom of the main service slide-valve 18 is, as has already been mentioned, the port 26 and the exhaust-passage $26^a$. This passage $26^a$ is in open communication with the atmosphere excepting when the brakes are applied by an excess fluid under pressure directly from the main train or brake pipe or when the automatic governor retaining-valve is closed. This automatic retaining-valve is shown in Figs. 7 and 9, 14 and 18 and is connected with an automatic governor retaining device marked B. The automatic governor-valve B is similar in most of its parts to the automatic governor-valve A already described. In the body of the casting is formed a cylindrical retaining-valve chamber 63, into which the exhaust-passage $26^a$ leads and from which chamber the exhaust-port 74 opens to atmosphere. In this chamber is an automatic retaining piston-valve 75, provided with suitable packing-rings 81 and adapted to make a tight joint between the piston and the side of the cylinder. Between the bottom of the automatic-retaining-valve chamber 63 and the piston 75 is a spiral spring 35, which normally holds the piston-valve in an elevated position, leaving the passage through the automatic-retaining-valve chamber 63 from the passage $26^a$ to the exhaust-port 74 open. Leading from the automatic-retaining-valve chamber 63 above the piston-valve 75 is a fluid-passage 36, which extends into the flexible-diaphragm chamber 37 and is controlled by the automatic governor pin-valve 39, which is connected with the disk hub 47 of the flexible diaphragm 38, as in the automatic governor-valve A already described. Leading into the flexible-diaphragm chamber is a passage 69 for fluid under pressure, which communicates with the main train or brake pipe or other suitable source of supply of fluid under pressure. Above the disk hub of the flexible diaphragm and bearing thereon is the automatic governor-spring 41 under sufficient tension of pressure to keep the pin-valve closed against a less fluid under pressure exerted on the flexible diaphragm than several pounds above the normal main train or brake pipe pressure of seventy pounds. When it is desirable to close the automatic governor retaining-valve 75, the engineer increases the fluid under pressure in the main train or brake pipe to, say, seventy-five pounds, which fluid under pressure is sufficient to overcome the resistance of the automatic governor-spring 41 and raise the pin-valve 39 from its seat 65 in the manner already described. This permits the fluid under excess pressure to pass from the flexible-diaphragm chamber into the passage 36, and thereby move the piston-valve 75 to its seat, which closes the exhaust-passage $26^a$ from atmosphere. When it is desirable to release the automatic governor retaining-valve 75, the fluid under excess pressure in the main train or brake pipe or other source of supply is reduced to less than seventy-five pounds, whereupon the pin-valve 39 is seated, cutting off fluid under excess pressure above the piston-valve 75, and the fluid in the passage 36 leaking through a vent-port to atmosphere releases the fluid under pressure above the valve in the piston-valve cylinder, and the valve 75 is carried back to its normal position by the spring 35 and with the fluid under pressure against the valve from passage $26^a$. The operation of the automatic governor retaining-valve marked B will be readily understood from the foregoing description of the parts, because at no time the fluid in the main-service-valve chamber will be above the normal, it being under control by the automatic governor-valve A, consequently the driving-piston 8 being held to its seat with a pressure of fluid above the normal, while the fluid under pressure in the main-service-valve chamber pressing against the the inner face of the piston is only normal. From a chamber 91 for fluid under pressure, which is formed in the body of the casting and is shown in Figs. 5 and 6, leads a passage 49, which extends to and communicates with the reducing-valve and the brake-piston cylinder, the purpose of this passage being to admit fluid under pressure from the main train or brake pipe to the brake-piston cylinder to make an application of the brakes without using the reserve fluid under pressure in the main-service-valve chamber, auxiliary reservoir, and auxiliary emergency-reservoir.

It is often desirable in quick-action automatic brake systems to apply a sudden and extreme emergency amount of fluid under pressure to the brake-piston cylinder. In my improved system I employ devices by means of which this high or excess pressure of fluid may be applied directly from the main train or brake pipe without reducing the fluid under pressure in the main-service-valve chamber, auxiliary reservoir, or auxiliary emergency-reservoir.

Leading from the main train or brake pipe chamber 5 or the piston-cylinder 7 is a passage 90 for fluid under pressure which extends to the flexible-diaphragm chamber 37 of the automatic governor-valve device, which I have designated as E, the automatic governor-valve portion of which device is similar in all respects to the automatic governor-valve device A, excepting that the tension of the automatic governor-spring 41 is arranged to resist an extreme excess pressure of fluid against the flexible diaphragm 38— say of eighty-five pounds. Leading from the flexible-diaphragm chamber 37 is a passage 36, which extends to the chamber 91, communication between this passage and the flexible-diaphragm chamber being normally closed by the automatic governor pin-valve 39. Extending from this chamber 91, as is already described, is the passage 49, which leads to the reducing-valve and brake-piston cylinder.

When it is desired to make an emergency application of the brakes directly from the main train or brake pipe, the engineer turns on an extreme excess pressure of fluid—say eighty-five pounds—in the main train or brake pipe. The first effect of this excess fluid under pressure in the brake-pipe is to close the automatic governor-valve A, preventing any excess of fluid under pressure from flowing into the main-service-valve chamber. The second effect of this excess fluid under pressure in the brake-pipe is to operate the automatic governor-valve B, thereby closing the retaining-valve 75, which closes the exhaust-passage leading to atmosphere from the brake-piston cylinder, the excess fluid under pressure passing directly through the passage 69 from the main train or brake pipe to the flexible-diaphragm chamber of the automatic governor-valve B. This excess fluid under pressure also passes through the passage 90 to the flexible-diaphragm chamber of the automatic governor-valve E, and thence, having raised the flexible diaphragm 38 and pin-valve 39 from its seat 65, it passes through the chamber 91 and the passages 49 24, communicating with the automatic duplex governor reducing-valves F and 67 directly to the brake-piston cylinder, applying the brakes with an emergency application with excess fluid under pressure in the main train or brake pipe. By this operation the brakes may be applied and released repeatedly without shifting the driving-piston 8, the main service-valve being held in its normal position by the use of the automatic governor-valve A, subject to a quick-service or emergency application of the brakes by fluid under pressure flowing through an always-open passage from the auxiliary reservoir and the main-service-valve chamber, shifting the driving-piston 8 to an application position by a reduction of fluid under pressure in the main train or brake pipe to a point below normal pressure in the main train or brake pipe when the automatic governor-valve A is closed.

In the use of the several automatic-governor-valve mechanisms A, B, and E to perpetuate an application of the brakes the automatic governor-valve A must be closed, and then the automatic retaining-valve 75, controlled by the automatic governor-valve B, must also be closed before fluid under pressure is allowed to pass from the main train or brake pipe through the several automatic governing devices to the brake-piston cylinder.

When it is desired to obtain a quick-action high-pressure service or emergency application of the brakes, the fluid under pressure in the main train or brake pipe is reduced—say to ten or fifteen pounds—and opened to atmosphere, which will cause the piston 8 to be shifted from its seat 76 to an emergency position by the fluid under pressure in the main-service-valve chamber and the auxiliary reservoir through an always-open passage from the auxiliary reservoir to the inner face of the driving-piston, said piston traveling its full movement in the driving-piston cylinder. To check the travel of the driving-piston 8 to cause only a service application of the brakes and also to prevent in an emergency application any shock or jar to the driving-piston or valve mechanism by this quick or sudden movement, a suitable buffing or regulating-stem mechanism is employed. This buffing mechanism consists of a stem 14, arranged in a suitable guide 4 in the chamber 5, where it is normally held in a forward position by the spring 15, so that its end will project through port 3 into the driving-piston cylinder 7. When the driving-piston 8 shifts to a service position, or to the right, a knob or projection 16 on the driving-piston 8 will strike against the regulating-stem 14. The striking of the knob 16 against the stem 14 limits the travel of the piston in a service application of the brakes, while in an emergency application of the brakes the spring 15 will take up the shock or jar. By this full movement of the driving-piston 8 and the main service slide-valve 18, as already stated, an emergency application of the brakes will be made by a full and free flow of all the fluid under pressure from the main-service-valve chamber through the service and emergency ports and from the automatic-governor-valve chamber and the auxiliary reservoir through an always-open passage between the main-service-valve chamber and the auxiliary reservoir, also of the normal main train or brake pipe pressure, or greater, contained in the storage-chamber 89 and in the auxiliary emergency-reservoir 102, which communicates therewith by the passage 101, and also from the main train or brake pipe, which main train or brake pipe fluid under pressure will flow into the passage 24 through the auxiliary reservoir and main-service-valve-chamber, the auxiliary reservoir being connected with the main train or brake pipe passage by the movement of the main-service-valve piston 8, which shifts the valve 86, uncovering the port 88 leading into the storage-chamber 89, auxiliary emergency reservoir passages 101, and passage $89^d$, which passage $89^d$ communicates with the main train or brake pipe chamber passage 5, and also by the shifting of the driving-piston 8 to an emergency position only. Then the pores in the driving-piston cylinder 7 are in communication with the main-service-valve chamber, auxiliary reservoir, and brake-piston cylinder, placing the main train or brake pipe directly in communication with said chambers. The pores in the piston-cylinder 7 leading to the passage $89^d$, and non-return check-valve $89^a$, which valve $89^a$ is in the passage $89^d$, as has already been stated, leads to the main train or brake pipe and is so adapted to admit fluid under pressure directly from the main train or brake pipe to the reducing-valve chamber and brake-piston cylinder continuously for any length of time desired or until all the fluid under pressure is exhausted in the main train or brake pipe, passing through the driving-piston cylinder 7 and through the service and emergency ports in the main-service-valve chamber independent of any other piston or a flexible diaphragm into the brake-piston cylinder. At the same time fluid under pressure is passing in the opposite end of the main-service-valve chamber to a reducing-valve chamber and to the brake-piston cylinder. In this passage $89^d$ is a cylindrical valve-chamber having a non-return check-valve $89^a$, which is normally held to its seat $89^b$ by a spring $89^c$. The tension of the spring is adjusted to keep the valve seated. The purpose of this check-valve is to retain all fluid under pressure which passes through the said valve-chamber, and thereby prevent leakage from the auxiliary reservoir and the main-service-valve chamber and brake-piston cylinder should a train be broken into sections, and it also retains the normal main train or brake pipe fluid under pressure, or greater, in storage-chamber 89 and auxiliary emergency-reservoir 102.

When there is an excess reduction of fluid under pressure in the main train or brake pipe, as already described, to allow fluid under pressure to pass from the auxiliary reservoir and main train or brake pipe to the brake piston cylinder through passage $89^d$, storage-chamber 89, and from the auxiliary emergency-reservoir 102, the port 9 will be closed by the piston 8 being shifted to an emergency position, and fluid under pressure will pass through and from the auxiliary reservoir through the passages 79 and 80, the main service slide-valve chamber 11, and the ports 82, 83, 84, 21, and 22 into the passage 24, into the automatic duplex governor reducing-valve F, and thence by the passage 67 or any other passage leading into the brake-piston cylinder, making an emergency application of the brakes, as already described, adding the fluid under pressure from the storage-chamber 89 and the auxiliary emergency-reservoir 102 to the fluid under pressure in the brake-piston cylinder. Then follows fluid under pressure from the main train or brake pipe through passage $89^d$ and non-return check-valve $89^a$, through both the porous piston-cylinder and the port 88, and this flow of fluid under pressure to the brake-piston cylinder will continue until the fluid under pressure in the brake-piston cylinder equals the fluid under pressure in the main train or brake pipe, and so continue to remain equal until the piston 8 is shifted to a release position. The effect of an excess reduction of fluid under pressure in the main train or brake pipe is therefore necessary to make an emergency application of the brakes and to place the fluid under equal pressure at the same time in the brake-piston cylinder, main-service-valve chamber, auxiliary reservoir, storage-chamber 89, and auxiliary emergency-reservoir 102, and in the valve-chambers of the automatic duplex governor reducing-valve F continuously for any length of time desired or until the fluid under pressure is exhausted in the main train or brake pipe.

The auxiliary emergency-reservoir 102 is a retainer to retain all fluid under pressure that passes through the port of the check-valve $89^a$ into and through the storage-chamber 89, the purpose of this emergency-reservoir being to supply an extra amount of fluid under pressure in an emergency application of the brakes, increasing the fluid under pressure in the brake-piston cylinder above that in the main train or brake pipe at the time of an emergency application of the brakes. This reservoir is in communication with the storage-chamber 89 by the passage 101, and this storage-chamber always has access to fluid under pressure direct from the main train or brake pipe, or the passage 101 may lead directly from the non-return check-valve chamber to the auxiliary emergency-reservoir.

From a passage 24 or any other passage communicating with the main-service-valve chamber and the brake-piston cylinder a passage 103 leads into the automatic governor reducing-valve chambers 37 of the automatic duplex governor or leakage apparatus, which I have designated by the letter F. This valve F may be a duplication of the mechanism employed in the automatic governor-valve E—that is, it consists of the passage 103, leading into a flexible-diaphragm chamber 37, having a flexible diaphragm 38, carrying an automatic-governor pin-valve 39, disk hub 47, and having a regulating-spring 41, which bears against the disk hub and holds the valve 39 normally closed against its seat 65. The pin-valve 39 is graduated—that is, the greater the fluid under pressure exerted against the flexible diaphragm the wider the valve will be held open and the greater the amount of fluid under pressure which will pass through the port of the valve. The tension of the governor-spring 41 is so regulated by the screw-plug 42 that the valve will open whenever a predetermined amount of fluid under pressure is exerted against the flexible diaphragm 38 and allow the fluid under pressure in the passage 24 from the main-service-valve chamber and leading to the brake-piston cylinder to escape to atmosphere through the port 104. This automatic governor-valve F may be single or duplex. When an automatic duplex governor-valve is used, as shown in Figs. 5 and 6, the tension of the automatic governor-spring 41 of one valve is greater than the tension of the automatic governor-spring in the other. The effect of this is that both valves will open, say, at seventy-five pounds of fluid under pressure in the passage 24 leading from the main-service-valve chamber; but one of the valves will close before the other, thereby causing a more gradual escape of the fluid under pressure in the passages as the fluid-pressure decreases, and thus prevents the skidding of the car-wheels.

In Fig. 3 I show a modification of the device shown in Fig. 1. A passage 114 leads from the check-valve 89$^a$ into a piston-cylinder 115, having an emergency slide-valve 116, moving on a flat seat 116$^a$, similar to seat 70$^a$, to which it is held by a spring 117, which bears against a cap 118, which is held in position by the piston-rod 119. When there is an emergency reduction of fluid under pressure in the main train or brake pipe, the fluid under pressure in the main-service-valve chamber acts on the piston 120, and so moves the same that it strikes the emergency-valve 116 and brings the port 121 in alinement with passage 122, which leads to the passage 24, communicating with the reducing-valve and with the brake-piston cylinder, thus allowing the flow of fluid under pressure from the auxiliary emergency-reservoir and main train or brake pipe to the brake-piston cylinder when the driving-piston 8 has been shifted to an emergency position by a reduction of fluid under pressure in the main train or brake pipe.

In Fig. 4 I show a modification of the automatic governor-valve A, a piston 105 and a slide-valve 106 being substituted for the flexible diaphragm 38 and pin-valve 39, as above described.

In Fig. 6 I show a modified form of the automatic duplex governor high-speed valve F, in which instead of the pin-valve 39 and flexible diaphragm 38 I employ a piston 105 and a slide-valve 106, the piston being acted on by the governor-spring 41 through a cap 107 and the slide-valve 106 being held to its seat 108 in the valve-chamber 110 by the spring 109 to close and open the ports 111. The pressure of the fluid from the passage 24, leading to the brake-piston cylinder, acts on the piston 105 in the same manner as it acts on the flexible diaphragm and the fluid-pressure passes to atmosphere through the ports 104 when the valves 106 are operated, as has already been described.

In Fig. 6, which figure shows the modification of the automatic duplex governor-valve F, I show a modification of the automatic governor-valve E, a piston 105 and a slide-valve 106 being substituted for the flexible diaphragm 38 and pin-valve 39, as has already been described.

In Fig. 8 I show a further modification in which a piston 133 is substituted for the flexible diaphragm 38, the pin-valve 39 resting against the seat 65 in the manner already described.

In Fig. 9 I show a modification of the automatic governor retaining-valve B, a piston 105 and a slide-valve 106 being substituted for the flexible diaphragm 38 and pin-valve 39, as above described.

In Fig. 10 I show a further modification of the automatic governor-valve F, in which the slide-valve 106 is omitted, or rather its place is taken by double piston-heads 112 and 113. The port 111 opens between the piston-heads and the port 103 in front of the outer piston-head. Thus when a predetermined pressure is exerted on the outer piston-head 113 the piston is moved against the pressure of the governor-spring 41 until the leakage-port 104 opens from between the piston-heads and the fluid-pressure from the passage 24 can pass or leak through the port 104 to atmosphere. This modification may be applied to governor-valves A, B, E, and F or any other reducing-valve.

In Fig. 11 I show a modification of the devices shown in Fig. 1. Instead of placing the main train or brake pipe in communication with the auxiliary reservoir by the movement of the main service-valve when the pressure in the auxiliary reservoir is greater than in the main train or brake pipe, as I have already described, I bring the main train or brake pipe in direct communication with the brake-piston cylinder. To this end the passage 89$^d$, leading from the main train or brake pipe through the non-return check-valve 89$^a$, communicates with a passage 89$^e$, which leads into the main-service-valve piston-cylinder chamber 7$^a$, which may be formed by the piston-heads 8 and 8$^a$. These piston-heads are caused to fit closely in the cylinder by suitable packing-rings. When the driving-piston 8 is caused to move by fluid under pressure in the main-service-valve chamber and auxiliary reservoir, the piston-head 8$^a$ passes the pores in the piston-cylinder chamber 7$^a$, leading to a passage 89$^e$, and allows the fluid under pressure from the main train or brake pipe and auxiliary emergency-reservoir to flow through the service and emergency ports in the main-service-valve chamber to the passage 24, which leads to the automatic governor reducing-valve F and to the brake-piston cylinder through the passage 67. This modification therefore affords direct communication between the main train or brake pipe and the brake-piston cylinder whenever an emergency application is made through the main-service-valve chamber by a reduction of fluid under pressure in the main train or brake pipe. I also show the automatic governor reducing-valve F inserted in the casing, so adapted that the flexible-diaphragm chamber 37 communicates with the main-service-valve chamber and the auxiliary reservoir adapted to admit to atmosphere any excess of fluid under pressure above seventy pounds, or normal main train or brake pipe pressure that may leak past the driving-piston 8 when there is an excess of fluid under pressure in the main train or brake pipe for the reasons that have already been stated in connection with the automatic governor-valve A. The tension of the automatic governor-spring 41 in this valve is set to resist a fluid-pressure of seventy pounds before the pin-valve will open, admitting to atmosphere from the main-service-valve chamber and auxiliary reservoir any quantity of fluid under pressure above seventy pounds.

The employment of the auxiliary emergency-reservoir will be readily understood from the foregoing description of the parts. Whenever an emergency application is made by a reduction of fluid under pressure in the main train or brake pipe, the main service-valve and driving-piston 8 being shifted to an emergency position the auxiliary emergency reservoir is brought in communication with the brake-piston cylinder, thereby giving additional power to an emergency application of the brakes. Then follows the fluid under pressure directly from the main train or brake pipe without resistance of fluid under pressure, and will continue until all the fluid is exhausted in the main train or brake pipe or until the driving-piston 8 is shifted to its normal position by increasing the fluid under pressure in the main train or brake pipe.

In Fig. 12 I show a further modification of the devices shown in Fig. 1. In this figure the emergency-valve 125 is situate in the main train or brake pipe passage and is adapted to be so operated by the movement of the driving-piston 8 as to open communication between the main train or brake pipe through the chamber 5 into a passage 122, leading to the passage 24 and reducing-valve chamber, which communicates with the brake-piston cylinder. In the passage 122 is a non-return check-valve 123, which prevents the return of pressure from the passage 122 to the main train or brake pipe. In this figure I also show a piston 124, which is connected with and is greater in area than the driving-piston 8, the object being to provide a greater surface for the fluid under pressure in the main-service-valve chamber than the surface for the fluid under pressure in the main train or brake pipe, whereby a more rapid movement of the driving-piston 8 is secured whenever there is a reduction of fluid under pressure in the main train or brake pipe, and its object is also to cause a quick emergency application following a service application of the brakes, such emergency application being caused by a further reduction of fluid under pressure in the main train or brake pipe without the necessity of increasing the fluid under pressure in the main train or brake pipe to reëstablish the fluid under pressure in the main-service-valve chamber and the auxiliary reservoir. The reason of this is that the area of the piston 124 being greater than the area of the driving-piston 8 there will be a greater amount of fluid under pressure on the piston 124 than on the driving-piston 8, even after the fluid under pressure in the main-service-valve chamber and auxiliary reservoir has been reduced to almost equal that fluid under pressure in the main train or brake pipe.

In Fig. 13 I show the emergency slide-valve 116 of Fig. 3 situate between the main service-valve and the auxiliary reservoir, the same passages connecting with the valve as in the case of Fig. 3.

In Fig. 15 I show a quick-action automatic duplex non-resistance-valve system operated by piston means, in which a slide-valve 125 is adapted to make an emergency application of the brakes with fluid under pressure directly from the main train or brake pipe and continuously for any length of time desired, which is operated by the shifting of the driving-piston 8, controlling the slide-valve 18, and is situate in the valve chamber or cylinder 126, formed in the chamber 5. In the valve 125 is a graduating-port 127, which is adapted to communicate with the port 128 in the flat seat $128^a$ in the valve-chamber leading into the passage 129, which leads to the non-return check-valve $89^a$ and the passage 24 and reducing-valve chamber, thence to the brake-piston cylinder. When fluid under pressure is reduced in the main train or brake pipe and the driving-piston 8 moves sufficiently to cause an emergency application of the brakes, the shoulder 130 on the piston emergency-valve rod 131 strikes the valve 125 and so moves the same as to bring the graduating-port 127 into communication with the port 128, or the emergency slide-valve 125 is adapted to be operated by the driving-piston 8 in a similar manner to the slide-valve 18 in an emergency application of the brakes. Thus while the slide-valve 18 is admitting the flow of fluid under pressure from the main-service-valve chamber and auxiliary reservoir through the emergency-ports to the brake-piston cylinder the slide-valve 125 is admitting fluid under pressure without any resistance directly to the brake-piston cylinder from the main train or brake pipe for any length of time desired. As the fluid under pressure in the main train or brake pipe or from any other passages does not act against the valve 125, there is no resistance at the time of an emergency application. This slide-valve 125 is provided with a spring 132, which serves to hold the valve to its seat. In rear of the end of the piston emergency-valve rod 131 of the driving-piston 8 is a spring-buffer or regulating-stem 14, which serves to check the further movement of the driving-piston 8 on a service application and until an emergency reduction of fluid under pressure in the main train or brake pipe overcomes the pressure of the spring.

In Figs. 7, 11, 12, 15, and 16 I show modification of the automatic governor-valve A. In Fig. 12 the chamber 7 is provided with the port 9, which is adapted to be opened and closed by the driving-piston 8; but the passages 12, 13, and 10, which lead to the main-service-valve chamber, are normally closed by the piston $31^a$, which seats by force of a spring $35^a$. This modified form operates as follows: Whenever the pressure in the main-service-valve chamber and the auxiliary reservoir is reduced below normal main train or brake pipe pressure, the flexible-diaphragm pin-valve 39 closes, removing the fluid under pressure from the upper face of the piston $33^a$. The fluid under pressure in the main train or brake pipe thereupon opens the piston-valve $31^a$, overcoming the force of the spring $35^a$ and allowing fluid under pressure to flow from the main train or brake pipe through the automatic governor-valve A and into the main-service-valve chamber until the fluid under pressure therein equals normal fluid under pressure in the main train or brake pipe. As the piston-valve $31^a$ is normally closed, whenever the passage 12 is closed by the driving-piston 8 there is a double closure of the passages leading from the main train or brake pipe passages to the main-service-valve chamber.

In Fig. 11 the piston-valve $31^a$ seats itself by gravity and the flexible-diaphragm chamber 37 is in communication with the main train or brake pipe passages instead of the main-service-valve chamber. In its operation the fluid under pressure from the main train or brake pipe, acting on the lower face of the piston-valve $31^a$, raises the valve and allows fluid under pressure to flow into the main-service-valve chamber until the fluid under pressure in the main-service-valve chamber and main train or brake pipe reaches seventy pounds. This pressure in the main train or brake pipe, acting in the flexible-diaphragm chamber 37, overcomes the force of the automatic governor-spring 41, raises the pin-valve 39, and allows the fluid under pressure from the main train or brake pipe to act on the piston $33^a$, thus closing and holding closed the valve $31^a$. The greater the fluid under pressure in the main train or brake pipe the more securely the valve $31^a$ will be held closed, thus shutting off the main-service-valve chamber from the main train or brake pipe, thereby controlling the fluid under pressure in the main-service-valve chamber and auxiliary reservoir, so the fluid under pressure in both chambers is under equal pressure at all times, regardless of the excess of fluid under pressure in the main train or brake pipe before or after an application of the brakes.

In Fig. 12 two emergency-valves, one of which is the emergency-valve 86 in the body of the main-service-valve chamber 11 and the other is the emergency-valve 125 described in connection with Fig. 15. These valves are adapted to be operated simultaneously by the driving-piston 8, and they both communicate with the passage 24, leading to the reducing-valve and to the brake-piston cylinder by the passages and ports already described in connection with Figs. 1 and 15.

In Fig. 14 I show a passage 49 leading to a series of ports $49^a$, which ports $49^a$ communicate the passage 49 with the automatic governor-retaining valve-chamber 63 through the walls of the chamber, so that the packing-rings 81 on the piston-valve 75 are on both sides of the ports $49^a$. When the said piston-valve or any other valve device is in its normal or elevated position, a normal open passage communicates the brake-piston cylinder with the atmosphere, as shown. The packing-rings 81 of the retaining-valve will prevent any loss or leakage of fluid under pressure from the brake-piston cylinder through passage 49 during the service application of the brakes. Any valve so adapted to perform the same functions may be employed while the end of the piston-valve opposed by the exhaust of fluid under pressure from the brake-piston cylinder is smaller in area than the opposite end, which end being charged with fluid under pressure from the main train or brake pipe or any other suitable source of supply. When an excess of fluid under pressure is used in the system to close the automatic retaining-valve device, thus perpetuating an application of the brakes, the valve 75 is forced to its seat, as before described. Then communication is established between the main train or brake pipe and the brake-piston cylinder, the exhaust from the brake-piston cylinder being closed when such communications are established through passage 69 or any other passage leading to the retaining-valve device or automatic governor-retaining-valve mechanism B, retaining-valve chamber 63, ports $49^a$, passage 49 24, or any other passage to the brake-piston cylinder. Thus the retaining-valve performs two functions simultaneously by closing the exhaust-passage $26^a$, leading to a series of ports 74 in the valve-chamber 63 from the brake-piston cylinder to atmosphere and admitting fluid under pressure directly from the main train or brake pipe to the brake-piston cylinder, perpetuating an application of the brakes any length of time desired.

The operation of the automatic duplex governor-valve is, as has already been stated, similar to the operation of the automatic governor-valve E. Its function, however, is different, as it serves to allow the fluid under pressure above a certain predetermined amount to gradually escape to atmosphere from the main-service-valve chamber 11, auxiliary reservoir, auxiliary emergency-reservoir, main train or brake pipe, and the brake-piston cylinder.

Although I have described certain forms and kinds of devices, I do not desire to limit myself to the same, as they may be varied and changed by a skilled mechanic without departing from the spirit and essence of my invention.

The advantages of my invention will be appreciated by those skilled in the art. Not only can the ordinary service application of the brakes be made where the automatic governor-valve A is open, but also a quick emergency application may be applied from the auxiliary reservoir by a free flow of fluid under pressure through an always-open passage between the driving-piston 8 and the auxiliary reservoir when the automatic governor-valve A is closed and the flow of fluid under pressure from the auxiliary emergency-reservoir and also from the main train or brake pipe continuously without any resistance of fluid under pressure from the latter until the fluid is exhausted.

The main spirit of my invention is to have mechanical devices in an air-brake system, so that the engineer may have full control of the air-brake apparatus at will on each car or vehicle when the main train or brake pipe is coupled together by the hose-coupling in a train of any length on grades, curves, or straight track without further assistance, and as long as he has fluid under the desired pressure on the engine the devices shown are means by which these results may be obtained, while other mechanical devices in which springs, flexible diaphragms, and threaded means, or springs, pistons, and threaded means or pressure-plates, any or parts, may be used and will perform the same functions as those shown in the drawings without departing from the spirit of the invention; to have automatic means to control all that quantity of fluid under any desired pressure at any time in the main-service slide-valve chamber through an always-open passage to and into the auxiliary reservoir, so that the fluid under pressure is equal in said chambers at the same time, while the fluid-pressure in the main train or brake pipe is cut off from the main-service-valve chamber for reasons that the fluid-pressure in the main train or brake pipe is in excess of that in the main-service-valve chamber; also, to have automatic means so adapted that at the will of the engineer said devices or those similar will operate by fluid under excess pressure and admitting fluid under such excess pressure to act or operate a valve device, such valve device being so adapted to close the exhaust-passage communicating the brake-piston cylinder duplex-leakage-device chamber with the atmosphere during any time while the main-service valve or a device controlling the fluid under pressure flowing from the auxiliary reservoir to the brake-piston cylinder is in an exhaust or any other position, thus closing all exhaust-passages communicating the brake-piston cylinder, the duplex leakage-valve chamber with the atmosphere for any length of time desired to make or perpetuate an application of the brakes; also, to have automatic devices to admit fluid under excess pressure directly from the main train or brake pipe to the duplex-leakage-device chamber, thence to the brake-piston cylinder, at the will of the engineer making or continuing an application of the brakes as long as it may be desirable in order to bring the train under complete control.

I am also enabled to cause a quick emergency application of the brakes to be made without any resistance from fluid under pressure in the system, which application will remain as long as may be desired from a reduction of fluid under pressure in the main train or brake pipe. This enables a quick emergency application to be made with certainty.

I am also enabled to make a quick emergency application of the brakes with fluid under pressure directly from the main train or brake pipe through other means and a porous piston-cylinder main-service-valve chamber into the brake-piston cylinder independent of any other piston or a flexible diaphragm by a reduction of fluid under pressure in the main train or brake pipe sufficiently to shift the driving-piston to an emergency position.

I am also enabled to cause a graduated reduction of fluid under pressure in the passages leading from the main-service-valve chamber to the brake-piston cylinder, whereby the leakage to atmosphere may be reduced one-half whenever the fluid under pressure has reached a predetermined point in the leakage device.

I am also enabled to close the automatic governor-valve A by direct fluid under pressure from the main train or brake pipe when the fluid under pressure in the main train or brake pipe is at or above normal, when I shut off the flow of fluid under pressure from flowing into the main-service-valve chamber and the auxiliary reservoir with an automatic governor device so adapted to be operated by fluid under pressure from the main-service-valve chamber or the main train or brake pipe.

I am also enabled to control to any predetermined point desired all that quantity of fluid under pressure both in the main-servicevalve chamber and the auxiliary reservoir, so the fluid under pressure in both chambers pressing against the inner side of the driving-piston 8 is equal at all times regardless of any excess of fluid under pressure in the main train or brake pipe.

I am also enabled to admit of a small quantity of air fluid under pressure to the brake-piston cylinder at a service application of the brakes.

I am also enabled to use any other suitable means other than that of a pin-valve and flexible diaphragm under pressure in connection with an automatic governor-spring under a tension of pressure to open communications between chambers and controlling the fluid under pressure in said chambers to be governed to any predetermined point desired.

I am also enabled to close the exhaust-passage from the brake-piston cylinder to the atmosphere with an excess of fluid under pressure directly from the main train or brake pipe and simultaneously admitting fluid under pressure directly from the main train or brake pipe to the brake-piston cylinder, perpetuating an application of the brakes with the same excess of fluid under pressure that operates an automatic retaining-valve mechanism, closing the exhaust-passage from the brake-piston cylinder to the atmosphere.

I am also enabled to maintain at all times an open passage between the automatic governor-valve mechanism, the inner face of the driving-piston, and the auxiliary reservoir regardless of the excess of fluid under pressure in the main train or brake pipe.

I am also enabled to automatically close and exhaust passage leading from the brake-piston cylinder to the atmosphere with the same excess of fluid under pressure that is in the brake-piston cylinder, which fluid under pressure being used to perpetuate an application of the brakes for any length of time desired, while the auxiliary reservoir is charged with fluid under pressure and also the main-service-valve chamber equal to that of the normal fluid under pressure in the main train or brake pipe and also the main service-valve is being held to its seat, subject to any application of the brakes by reduction of fluid under pressure in the main train or brake pipe.

I am also enabled after an application of the brakes by a reduction of fluid under pressure in the main train or brake pipe to automatically cause the main service-valve to retract its movement, the same pressure being an excess pressure simultaneously acting on a valve closing the exhaust-passage leading from the brake-piston cylinder to the atmosphere without any loss of fluid under pressure in the brake-piston cylinder during the application, thus keeping the brakes applied for any length of time desired.

I am also enabled to automatically close the exhaust-passage leading from the brake-piston cylinder to atmosphere by an excess of fluid under pressure in the system either before or after an application of the brakes or when it is desirable to release the brakes, but at a time when a perpetuation of an application is desired and for any length of time that such perpetuation of the application may be required to control the train.

I am also enabled to automatically close the exhaust-passage leading from the brake-piston cylinder to atmosphere with any desired amount of excess of fluid under pressure in the system, maintaining at all times any predetermined amount of fluid under pressure desired in the main-service-valve chamber and auxiliary reservoir; also, in connecting parts and passages therewith controlling the fluid under pressure in the system, so it may be equal in the main train or brake pipe auxiliary reservoir and brake-piston cylinder, or the said parts may be charged with fluid under pressure, so each part will be at any different point of pressure desired.

I am also enabled to automatically close or open the exhaust-passage leading from the brake-piston cylinder to the atmosphere regardless of any movement of the main-service-valve device or any pressure therein or when the main service-valve is in a released position, closing the exhaust-passage any length of time desired.

I am also enabled to make an application of the brakes by a reduction of fluid under pressure in the main train or brake pipe at a time when the fluid under pressure in the main-service-valve chamber and auxiliary reservoir is less than that fluid under pressure in the main train or brake pipe.

I am also enabled to admit a greater amount of fluid under pressure from the auxiliary reservoir, auxiliary emergency-reservoir, and other chambers in the system through the main-service-valve chamber to the brake-piston cylinder at the same time than from the brake-piston cylinder to the atmosphere, the valve being so adapted to cause such results.

I am also enabled to automatically close the exhaust-passage leading from the brake-piston cylinder to the atmosphere after the main-service-valve device has been shifted to a released position.

I am also enabled to combine the automatic governor-valve mechanism B with the automatic-governor-valve mechanism E into a duplex mechanism so adapted that the passage 36 of one valve device may lead from a valve-chamber to and into a chamber to admit fluid under pressure from the main train or brake pipe to act on a retaining-valve device 75, closing the exhaust-passage leading from the brake-piston cylinder to the atmosphere, while another passage, 36, of the other valve device may lead from a valve-chamber to and into a chamber or passage to admit fluid under pressure from the main train or brake pipe to the brake-piston cylinder, perpetuating an application of the brakes. The tension of the governor-spring 41 in each device would remain the same, as has been described. A cylindrical threaded disk member may be inserted in the cylindrical bottom portions of the retaining-valve chamber between the spring 35 and the bottom of said chamber. Its functions are to compress the spring 35 to any tension of pressure desired, this tension of pressure against the retaining-valve piston is such that when being added to the fluid under pressure from the brake-piston cylinder to open said retaining-valve against the fluid under pressure from the main train or brake pipe when it is at a less point of pressure than required to close the retaining-valve with an excess pressure from the main train or brake pipe.

I am also enabled to couple the hose of a rear car uncharged with fluid-pressure to one that is charged with fluid-pressure without shifting the main service-valve on the car charged with fluid-pressure without making an application of the brakes by increasing the fluid-pressure in the main train or brake pipe above the normal when such rear-car hose-coupling is made.

It is a further object of my invention to provide suitable gasket-packing secured to the chamber and piston parts in the device, so that an air-tight partition is formed when the driving-piston is seated to prevent the excess pressure in the main train or brake pipe from leaking by the driving-piston into the main-service-valve chamber.

It is a further object of my invention to provide for a retaining-spring to be secured to the train-pipe side of the driving-piston, adapted to pass through a port in the casting at its rear and so formed that it will adjust itself in a retaining-groove formed in the casting or other suitable means for the purpose of holding the driving-piston in an emergency position, admitting the fluid under pressure in the main train or brake pipe to flow through the porous piston-cylinder into the brake-piston cylinder and remain in such retention until the fluid under pressure is increased in the main train or brake pipe, which pressure will shift the driving-piston to a released position.

I am also enabled to attain all of the advantages hereinbefore enumerated in the specification and the preamble thereto.

What I do claim, and desire to secure by Letters Patent of the United States, is—

1. In a quick-action automatic fluid-pressure brake system, the combination of a brake-piston cylinder, an auxiliary reservoir, a main train or brake pipe, and a main service-valve, means to increase the fluid under pressure in an auxiliary emergency-reservoir, above the pressure in the main-service-valve chamber after said chamber has been cut off from communications with the main train or brake pipe, substantially as set forth.

2. In a quick-action automatic fluid-pressure brake system, the combination of a brake-piston cylinder, an auxiliary reservoir, a main train or brake pipe, a main service-valve, duplex leakage means in a passage leading to the main-service-valve-chamber bushing, and a driving-piston connected with a valve, means to regulate the travel of the driving-piston, the said driving-piston having pressure-surfaces of different areas on opposite sides, and is operated between the main train or brake pipe and the main-service-valve chamber and adapted to make an emergency application of the brakes, by fluid flowing from an auxiliary emergency-reservoir, and main train or brake pipe into the duplex-leakage-device chamber thence to the brake-piston cylinder, when a reduction of fluid under pressure in the main train or brake pipe, following a service application of the brakes made by a smaller amount of said reduction, of fluid under pressure and without first increasing the fluid under pressure in the main train or brake pipe to recharge the auxiliary reservoir, means to increase the fluid-pressure in the auxiliary emergency-reservoir above that of the main-service-valve chamber, after said chamber has been cut off from the main train or brake pipe before a reduction of fluid under pressure in said main train or brake pipe, substantially as set forth.

3. In a quick-action automatic fluid-pressure brake system, the combination of a brake-piston cylinder, an auxiliary reservoir, a main train or brake pipe, a main service-valve, means to charge an auxiliary emergency-reservoir with pressure so it will reserve a greater quantity of fluid under pressure, than that in the main-service-valve chamber and auxiliary reservoir, when the main-service-valve chamber is cut off from the main train or brake pipe, subject only to emergency application of the brakes added to the fluid-pressure flowing through the piston-cylinder porous bushing from the main train or brake pipe, through a duplex leakage-valve to the brake-piston cylinder by a reduction of fluid under pressure in the main train or brake pipe, substantially as set forth.

4. In a quick-action automatic fluid-pressure brake system, the combination of a brake-piston cylinder, an auxiliary reservoir, a main train or brake pipe, a main service-valve and a duplex reducing-valve operated by fluid under pressure during an application of the brakes, by an increase or decrease of fluid under pressure in the main train or brake pipe, substantially as set forth.

5. In a quick-action automatic fluid-pressure brake system, the combination of a brake-piston cylinder, an auxiliary reservoir, a main train or brake pipe, a main service-valve, and an emergency-valve adapted to be so operated when the fluid-pressure in the main-service-valve chamber is less than that in the main train or brake pipe as to cause an emergency application of the brakes by a reduction of fluid under pressure in the main train or brake pipe, simultaneously opening communication through a piston-cylinder porous bushing, admitting fluid under pressure directly, from the main train or brake pipe into the duplex leakage device, thence to the brake-piston cylinder, said valve being free from the resistance of fluid under pressure during the application, substantially as set forth.

6. In a quick-action automatic fluid-pressure brake system, the combination of a brake-piston cylinder, an auxiliary reservoir, a main train or brake pipe, a main service-valve, means to cut off the main-service-valve chamber from the main train or brake pipe when it is desirable to have an excess pressure in said main train or brake pipe, means simultaneously admitting fluid from an auxiliary emergency-reservoir, also fluid-pressure through a piston-cylinder porous bushing to the brake-piston cylinder, said means adapted to also admit from the emergency-reservoir into a leakage-valve chamber thence to the brake-piston cylinder, during an application of the brakes by a reduction of fluid under pressure in the main train or brake pipe, a greater amount of fluid under pressure than exists in the main-service-valve chamber at the time of an application of the brakes, substantially as set forth.

7. In a quick-action automatic fluid-pressure brake system, the combination of a brake-piston cylinder, an auxiliary reservoir, a main train or brake pipe, a main service-valve, and an automatic governor-valve adapted to be operated by fluid under pressure at or above normal from the main train or brake pipe to close communication between the main train or brake pipe, and the main-service-valve chamber any time while the main service-valve is in its normal position, substantially as set forth.

8. In a quick-action automatic fluid-pressure brake system, the combination of a brake-piston cylinder, an auxiliary reservoir, a main train or brake pipe, a main service-valve, and an automatic governor-valve normally closed and adapted to shut off communications between the main-service-valve chamber and the main train or brake pipe, when the fluid under pressure in the said valve-chamber and to govern the fluid under pressure in said chamber any time while the main service-valve is in its normal position, substantially as set forth.

9. In a quick-action automatic fluid-pressure brake system, the combination of a brake-piston cylinder, an auxiliary reservoir, a main train or brake pipe, a main service-valve, and an automatic governor-valve having a leakage-port to allow the escape of any excess of fluid under pressure to atmosphere which may leak into the main-service-valve chamber during the time when the fluid under pressure in the main train or brake pipe is greater than the fluid under pressure in the main-service-valve chamber, substantially as set forth.

10. In a quick-action automatic fluid-pressure brake system, the combination of a brake-piston cylinder, an auxiliary reservoir, a main train or brake pipe, a main service-valve, means to cut off the fluid-pressure from the main-service-valve chamber when it is desired to have a greater pressure in the main train or brake pipe to operate other means without increasing the pressure in said chamber, and an emergency-valve with the valve-chamber open at both ends adapted to be operated by a reduction of fluid under pressure in the main train or brake pipe, to admit fluid under pressure from the said main train or brake pipe into a duplex leakage-valve chamber thence to the brake-piston cylinder, through the piston-cylinder porous bushing, without any resistance of fluid under pressure in the said emergency-valve chamber the pressure will flow continuously for any length of time desired or until it is exhausted in the main train or brake pipe, substantially as set forth.

11. In a quick-action automatic fluid-pressure brake system, the combination of a brake-piston cylinder, an auxiliary reservoir, a main train or brake pipe, a main service-valve, and an automatic governor-valve being a supplemental device on each car or vehicle, adapted to move with a pressure-plate, an automatic governor-spring held to resist an excess of fluid under pressure from the main train or brake pipe to a predetermined point above the normal on each car, and provided with a spherical tapered reinforcing-ring to permit of a spherical or central movement of said plate when fluid under pressure is exerted against the plate from the main train or brake pipe that communicates with the air-brake apparatus on each car or vehicle in order to open the valve, the pressure flowing through said opening and forcing a device to its seat, cutting off the flow of fluid from the said main train or brake pipe to the main-service-valve chamber, substantially as set forth.

12. In a quick-action automatic fluid-pressure brake system, the combination of a brake-piston cylinder, an auxiliary reservoir, a main train or brake pipe, and a main service-valve which controls the flow of fluid under pressure from the auxiliary reservoir at a service application, means to increase the fluid-pressure in the auxiliary emergency-reservoir above that fluid-pressure in the main-service-valve chamber when an excess of pressure is desired in the main train or brake pipe such excess being cut off from said main-service-valve chamber, when such greater fluid under pressure in the auxiliary emergency-reservoir is used the fluid will also flow through the piston-cylinder porous bushing from the main train or brake pipe into a duplex-leakage-valve chamber thence to the brake-piston cylinder, during an application of the brakes by a reduction of fluid under pressure in the main train or brake pipe, substantially as set forth.

13. In a quick-action automatic fluid-pressure brake system, the combination of a brake-piston cylinder, an auxiliary reservoir, a main train or brake pipe, a main service-valve, an always-open passage between the main service-valve and the auxiliary reservoir, said main service-valve controls the flow of fluid under pressure from the auxiliary reservoir at a service application and also the fluid under pressure from an auxiliary emergency-reservoir at an emergency application of the brakes, the fluid will also flow through the piston-cylinder porous bushing, from the main train or brake pipe, into a leakage-valve chamber thence to the brake-piston cylinder, an automatic duplex governor-valve or leakage device adapted to be so operated by excess fluid under pressure in an always-open passage leading from the main-service-valve ports to the leakage device thence to the brake-piston cylinder, and also to the retaining-valve chamber when an application of the brakes is made by fluid under pressure flowing into the brake-piston cylinder, the duplex leakage device is to cause a leakage therefrom during an application of the brakes by a reduction or an excess of pressure above the normal in the main train or brake pipe, such excess pressure also operates means to cut off the flow of fluid from the main train or brake pipe from flowing into the main-service-valve chamber and also operates means to close the exhaust-passage leading from the brake-piston cylinder to the atmosphere, substantially as set forth.

14. In a quick-action automatic fluid-pressure brake system, the combination of a brake-piston cylinder, an auxiliary reservoir, an auxiliary emergency-reservoir, a main train or brake pipe, a main service-valve which controls the flow of fluid under pressure from the auxiliary reservoir, the auxiliary emergency-reservoir, and the main train or brake pipe, into the brake-piston cylinder, having operative means to retain fluid under pressure equal to or greater than normal fluid under pressure in the main train or brake pipe in an auxiliary emergency-reservoir, during a sevice application of the brakes, by a reduction of fluid under pressure in the main train or brake pipe, a leakage device governed to open to atmosphere at a predetermined point of fluid under pressure with access to the brake-piston cylinder, and adapted to operate when fluid under pressure has reached a predetermined point in the chambers of the system, during an application of the brakes by an increase or decrease of fluid under pressure in the main train or brake pipe; substantially as set forth.

15. In a quick-action automatic fluid-pressure brake system, the combination of a brake-piston cylinder, an auxiliary reservoir, a main train or brake pipe, a main service-valve, an always-open passage between the main service-valve and the auxiliary reservoir, the said main service-valve controls the flow of fluid under pressure from the auxiliary reservoir, the auxiliary emergency-reservoir and through the piston-cylinder porous bushing without resistance of pressure from the main train or brake pipe, into a duplex-leakage-valve device, thence into the brake-piston cylinder, having operative duplex means to admit of a leakage to atmosphere from an always-open passage leading from the main-service-valve ports through the leakage-valve chamber to the brake-piston cylinder, said means being normally held closed from admitting fluid under pressure to escape to atmosphere from said passages and chambers until a predetermined fluid under pressure has been reached therein, when such means are operated by excess pressure from the main train or brake pipe said pressure operates means to cut off the flow of fluid from the main train or brake pipe from flowing into the main-service-valve chamber, and also operates means to close the exhaust-passage leading from the brake-piston cylinder to the atmosphere during an application of the brakes by an increase of fluid under pressure in the main train or brake pipe, substantially as set forth.

16. In a quick-action automatic fluid-pressure brake system, the combination of a brake-piston cylinder, an auxiliary reservoir, a main train or brake pipe, a main service-valve, an always-open passage between the auxiliary reservoir and the main-service-valve chamber, also between the brake-piston cylinder, duplex leakage device and the main-service-valve ports, said main service-valve controls the flow of fluid under pressure from the auxiliary reservoir, an auxiliary emergency-reservoir and through the piston-cylinder porous bushing from the main train or brake pipe, into a duplex-leakage-valve chamber thence to the brake-piston cylinder, a duplex valve normally held to its seat by springs under a predetermined tension of pressure, said valve being adapted to place the passages communicating with the brake-piston cylinder, main-service-valve ports, retaining-valve chamber, in communication with the atmosphere when a predetermined fluid under pressure has been attained, during an application of the brakes by an excess pressure in the main train or brake pipe, said pressure also operates means to cut off the flow of fluid under pressure in the main train or brake pipe from flowing into the main-service-valve chamber and closing the exhaust-passages leading from the brake-piston cylinder to the atmosphere; substantially as set forth.

17. In a quick-action automatic fluid-pressure brake system, the combination of a brake-piston cylinder, an auxiliary reservoir, a main train or brake pipe, a main service-valve, an always-open passage between the main service-valve and the auxiliary reservoir, an always-open passage between the main-service-valve ports and the brake-piston cylinder, said main service-valve controls the flow of fluid under pressure from the auxiliary reservoir and the auxiliary emergency-reservoir and through the piston-cylinder porous bushing from the main train or brake pipe into a duplex-leakage-valve chamber, thence to the brake-piston cylinder, having automatic predetermined duplex governing means normally held to close a leakage-port in an always-open passage leading from the main-service-valve ports to the brake-piston cylinder, means adapted to open said ports automatically when fluid under pressure has reached a predetermined point in the passages leading to the brake-piston cylinder, and exhaust-passages leading thereto, retaining-valve chamber being closed during an application of the brakes by an excess of fluid-pressure in the main train or brake pipe, after the flow of fluid-pressure from the main train or brake pipe is cut off by governing means from flowing into the main-service-valve chamber, to have an excess of pressure above that in the main-service-valve chamber to operate devices for closing the exhaust-passage, from the brake-piston cylinder to the atmosphere, substantially as set forth.

18. In a quick-action automatic fluid-pressure brake system, the combination of a brake-piston cylinder, an auxiliary reservoir, a main train or brake pipe, a main service-valve, an always-open passage between the main-service-valve chamber and the auxiliary reservoir, an always-open passage between the brake-piston cylinder, duplex leakage-valve, and main-service-valve ports, the said main service-valve controls the flow of fluid under pressure from the auxiliary reservoir, an auxiliary emergency-reservoir and through the piston-cylinder porous bushing from the main train or brake pipe, into a leakage-valve chamber thence to the brake-piston cylinder, operative means on either the auxiliary reservoir or main train or brake pipe side of the driving-piston, adapted to admit simultaneously fluid-pressure from an auxiliary emergency-reservoir and main train or brake pipe, without any resistance of fluid-pressure, into the brake-piston cylinder, having automatic predetermined, duplex leakage means to reduce the fluid under pressure in the passages leading to the brake-piston cylinder, auxiliary reservoir, auxiliary emergency-reservoir, main service-valve and automatic-governor-valve chambers, at the time of a brake application, by a reduction of fluid under pressure in the main train or brake pipe, immediately after the reduction of fluid under pressure in the main train or brake pipe a perpetuation of the brake application may be had by an excess of fluid-pressure in the main train or brake pipe, the excess pressure operates means to cut off the flow of fluid-pressure from the main train or brake pipe from flowing into the main-service-valve chamber, and operating means to close the exhaust-passage leading from the brake-piston cylinder to the atmosphere, substantially as set forth.

19. In a quick-action automatic fluid-pressure brake system, the combination of a brake-piston cylinder, an auxiliary reservoir, an auxiliary emergency-reservoir, a main train or brake pipe, a main service-valve which controls the flow of fluid under pressure from the auxiliary reservoir, the auxiliary emergency-reservoir, and main train or brake pipe, into the brake-piston cylinder, having a passage leading from the main train or brake pipe to the auxiliary emergency-reservoir, the auxiliary reservoir, the main-service-valve chamber, the automatic-governor-valve chamber, and the brake-piston cylinder, automatic means in said passage adapted to shut off fluid under pressure from the main train or brake pipe during an application of the brakes by a reduction of fluid under pressure in the main train or brake pipe, until the fluid under pressure in said reservoirs and chambers is less than that in the main train or brake pipe, a leakage-valve in communication with said passage and leading to atmosphere; substantially as set forth.

20. In a quick-action automatic fluid-pressure brake system, the combination of a brake-piston cylinder, an auxiliary reservoir, a main train or brake pipe, a main service-valve, means to reduce the pressure in the main-service-valve chamber and passages extending between the main train or brake pipe and the brake-piston cylinder, a duplex leakage device in said passage, and an emergency-valve having no resistance of fluid under pressure in its chambers, controlling the flow of fluid under pressure from the main train or brake pipe to the brake-piston cylinder, during an application of the brakes, by a reduction of fluid under pressure in the main train or brake pipe, said emergency-valve being operated by the movement of the main service-valve, the shifting of the main service-valve to an emergency position opens a passage through the piston-cylinder porous bushing from the main train or brake pipe to the said leakage-valve chamber thence to the brake-piston cylinder, substantially as set forth.

21. In a quick-action automatic fluid-pressure brake system, the combination of a main train or brake pipe, an auxiliary reservoir, a main service-valve, an auxiliary emergency-reservoir, a brake-piston cylinder and an automatic duplex leakage-valve, will operate during an application of the brakes, by an increase or decrease of fluid under pressure in the main train or brake pipe; substantially as set forth.

22. In a quick-action automatic fluid-pressure brake system, the combination of a brake-piston cylinder, an auxiliary reservoir, a main train or brake pipe, a main service-valve, an automatic duplex leakage device, consisting of an automatic governor-spring pressure device, and a graduated valve and valve-seat, said valve being adapted to be opened by an excess of fluid under pressure in an always-open passage between the main-service-valve ports and the brake-piston cylinder, said duplex means will admit a greater or less amount of fluid under pressure to escape to atmosphere, when the retaining-valve is closed perpetuating an application of the brakes, according to the degree of fluid under pressure in the passages leading to the retaining-valve chamber, and into the brake-piston cylinder from the said main-service-valve ports or main train or brake pipe, during an application of the brakes, when there is an excess of fluid under pressure in the main train or brake pipe and an open passage between the main service-valve and the auxiliary reservoir, the excess pressure in the main train or brake pipe operates a device to cut off the fluid from flowing into the main-service-valve chamber, substantially as set forth.

23. In a quick-action automatic fluid-pressure brake system, the combination of a brake-piston cylinder, a main train or brake pipe, a main service-valve, an auxiliary reservoir, an automatic governor-valve for admitting an excess of fluid under pressure into the brake-piston cylinder while the main service-valve is being held to its seat, and an automatic duplex leakage-valve, operated during an application of the brakes by an increase or decrease of fluid under pressure in the main train or brake pipe; substantially as set forth.

24. In a quick-action automatic fluid-pressure brake system, the combination of a brake-piston cylinder, an auxiliary reservoir, a main service-valve and a main train or brake pipe, an automatic governor-valve for admitting an excess of fluid under pressure into the brake-piston cylinder, an automatic-governor-retaining valve, operated by fluid under pressure at or above normal, and an automatic leakage-valve, operated during an application of the brakes by an increase or decrease of fluid under pressure in the main train or brake pipe; substantially as set forth.

25. In a quick-action automatic fluid-pressure brake system, the combination of a brake-piston cylinder, an auxiliary reservoir, a main train or brake pipe, and a main service-valve, an automatic governor-valve operated by fluid under pressure at or above normal for closing communication between the main train or brake pipe and the main-service-valve chamber, an automatic governor-valve for admitting an excess of fluid under pressure to the brake-piston cylinder, causing an application of the brakes, and an automatic leakage-valve, operated during an application of the brakes by an increase or decrease of fluid under pressure in the main train or brake pipe; substantially as set forth.

26. In a quick-action automatic fluid-pressure brake system, the combination of a brake-piston cylinder, an auxiliary reservoir, a main train or brake pipe, and a main service-valve, means to reduce the pressure in the main-service-valve chamber, having passages leading from the main train or brake pipe, through the piston-cylinder porous bushing to the leakage-valve chamber thence to the brake-piston cylinder, means adapted to operate an emergency-valve in a chamber between the main train or brake pipe and the main-service-valve chamber, to open communications directly with the main train or brake pipe, and the duplex-leakage-valve device, thence to the brake-piston cylinder, when there is a reduction of fluid under pressure in the main train or brake pipe, substantially as set forth.

27. In a quick-action automatic fluid-pressure brake system, the combination of a brake-piston cylinder, an auxiliary reservoir, an auxiliary emergency-reservoir, a main train or brake pipe and a main service-valve, having piston means so adapted as to move between and operate a service-valve and an emergency-valve, by having duplex piston-valve rods, both valves being in communication with the auxiliary reservoir, auxiliary emergency-reservoir and the main train or brake pipe, during an emergency application of the brakes, by reduction of fluid under pressure in the main train or brake pipe; substantially as set forth.

28. In a quick-action automatic fluid-pressure brake system, the combination of a brake-piston cylinder, an auxiliary reservoir, a main train or brake pipe and a main service-valve, having in an automatic-governor air-brake system, normally closed passages between the main train or brake pipe and the main-service-valve chamber; substantially as set forth.

29. In a quick-action automatic fluid-pressure brake system, the combination of a brake-piston cylinder, an auxiliary reservoir, a main train or brake pipe and a main service-valve, having in an automatic-governor air-brake system, a plurality of cut-off valves to cut off the flow of fluid under pressure between the main train or brake pipe and the main-service-valve chamber at the time of a reduction of the fluid under pressure in the main train or brake pipe to make an application of the brakes; substantially as set forth.

30. In a quick-action automatic fluid-pressure brake system, the combination of a brake-piston cylinder, an auxiliary reservoir, a main train or brake pipe, a main service-valve, a duplex-leakage-valve device, said main service-valve having a driving-piston adapted to be operated between the main train or brake pipe and the main-service-valve chamber, with unequal-pressure surfaces on opposite sides, adapted to operate emergency-valves on each side of said piston to admit fluid under pressure from an auxiliary emergency-reservoir, and the main train or brake pipe into the said duplex-leakage-device chamber, thence to the brake-piston cylinder, operative means to increase the fluid-pressure in the said auxiliary emergency-reservoir above that of the main-service-valve chamber and auxiliary reservoir before a reduction of fluid-pressure in the main train or brake pipe to make an application of the brakes, substantially as set forth.

31. In a quick-action automatic fluid-pressure brake system, the combination of a brake-piston cylinder, an auxiliary reservoir, a main train or brake pipe, a main service-valve, a supplemental duplex reducing-valve, in an always-open passage between the main-service-valve ports and the brake-piston cylinder, said duplex valves having governor-springs to be compressed to any desired tension of pressure before the pressure-plate has a spherical or central movement, the said plate being held between the spring and the valve-chamber seat to permit the escape of fluid under pressure from the passages leading to brake-piston cylinder, to atmosphere when said fluid under pressure is above a predetermined point in all passages communicating with said duplex device, means operative in a passage leading from the main train or brake pipe to the main-service-valve chamber, to stop the flow of pressure from the main train or brake pipe from flowing into the main-service-valve chamber, when the pressure in said chamber or main train or brake pipe is at a predetermined point, substantially as set forth.

32. In a quick-action automatic fluid-pressure brake system, the combination of a brake-piston cylinder, an auxiliary reservoir, a main train or brake pipe, an auxiliary emergency-reservoir, a main service-valve, an emergency-valve in the body of the main service-valve, and a separate emergency-valve, said emergency-valves being adapted to be moved simultaneously by a reduction of fluid under pressure in the main train or brake pipe, and having passages in communication with each other, with the main train or brake pipe, auxiliary reservoir, auxiliary emergency-reservoir and with the brake-piston cylinder; substantially as set forth.

33. In a quick-action automatic fluid-pressure brake system, the combination of a brake-piston cylinder, an auxiliary reservoir, a main train or brake pipe, a main service-valve and an emergency-valve, both ends of the valve-cylinder chamber of said emergency-valve being at all times in communication with the main train or brake pipe and with the driving-piston cylinder 7, so that the emergency-valve is free to move without resistance of fluid under pressure in the valve-chamber when there is a reduction of fluid under pressure in the main train or brake pipe; substantially as set forth.

34. In a quick-action automatic fluid-pressure brake system, the combination of a brake-piston cylinder, an auxiliary reservoir, a main train or brake pipe, a main service-valve, emergency-valves adapted to be operated on each side of the driving-piston, having a valve-chamber open at both ends and adapted to be operated without resistance of fluid under pressure from the main train or brake pipe or any other source of supply by the movement of the driving-piston, which movement operates means on either the auxiliary reservoir or main train or brake pipe side of the driving-piston adapted to admit simultaneously fluid-pressure from an auxiliary emergency-reservoir, and main train or brake pipe, through the piston-cylinder porous bushing and through the emergency-valve ports into the duplex-leakage-valve chamber and thence to the brake-piston cylinder, operative means to increase the fluid-pressure in the auxiliary emergency-reservoir above that of the main-service-valve chamber and the auxiliary reservoir, before a reduction of fluid-pressure in the main train or brake pipe, substantially as set forth.

35. In a quick-action automatic fluid-pressure brake system, the combination of a brake-piston cylinder, an auxiliary reservoir, an auxiliary emergency-reservoir, a main train or brake pipe, a main service-valve, an emergency-valve, and a driving-piston having a rod on one side adapted to operate the main service-valve and a rod on the opposite side adapted to operate an emergency graduated valve, the valves are operated by a reduction of fluid under pressure in the main train or brake pipe; substantially as set forth.

36. In a quick-action automatic fluid-pressure brake system, the combination of a brake-piston cylinder, an auxiliary reservoir, a main train or brake pipe, an auxiliary emergency-reservoir, a main service-valve, a separate emergency graduated valve, and a driving-piston having devices for operating both the main service-valve and the emergency-valve, when a reduction of fluid under pressure takes place in the main train or brake pipe; substantially as set forth.

37. In a quick-action automatic fluid-pressure brake system, the combination of a brake-piston cylinder, an auxiliary reservoir, a main train or brake pipe, an auxiliary emergency-reservoir, a main service-valve, having emergency-valve on each side of the main service-valve, having access with the main service-valve and all its movements or when the main service-valve is in its normal position, substantially as set forth.

38. In a quick-action automatic fluid-pressure brake system, the combination of a brake-piston cylinder, an auxiliary reservoir, a main train or brake pipe, an auxiliary emergency-reservoir, a main service-valve, having an automatic governor-valve so adapted to control the flow of fluid under pressure passing through the main service and emergency valve chambers, when the fluid under pressure is greater in the main train or brake pipe than in said chamber, substantially as set forth.

39. In a quick-action automatic fluid-pressure brake system, the combination of a brake-piston cylinder, an auxiliary reservoir, a main train or brake pipe, a main service-valve, having a driving-piston and means so adapted that when it retracts its movement by fluid under pressure being increased in the main train or brake pipe, the piston and main service-valve cuts off the flow of fluid under pressure flowing from an auxiliary reservoir, an auxiliary emergency-reservoir, the main train or brake pipe to the duplex leakage device and thence to the brake-piston cylinder, operative means to increase the fluid-pressure in the auxiliary emergency-reservoir above that in the main-service-valve chamber, and auxiliary reservoir before a reduction of fluid-pressure in the main train or brake pipe; substantially as set forth.

40. In a quick-action automatic fluid-pressure brake system, the combination of a brake-piston cylinder, an auxiliary reservoir, a main train or brake pipe, an auxiliary emergency-reservoir, a main service-valve, operative means in an automatic governor device to admit to atmosphere any fluid under pressure in the main-service-valve chamber and auxiliary reservoir above the normal fluid under pressure in the main train or brake pipe, to prevent a multiple application of the brakes by a reduction of excess fluid under pressure in the main train or brake pipe down to the normal, substantially as set forth.

41. In a quick-action automatic fluid-pressure brake system, the combination of a brake-piston cylinder, an auxiliary reservoir, a main train or brake pipe, an auxiliary emergency-reservoir, a main service-valve, having a passage in the chest or casing leading from the main train or brake pipe to the porous bushing forming the piston-cylinder, operative means so adapted to admit fluid under pressure directly from the main train or brake pipe to the piston-cylinder, main-service-valve chamber and auxiliary reservoir, before or after an application of the brakes, means operated by an increase or decrease of fluid under pressure in the main train or brake pipe.

42. In a quick-action automatic fluid-pressure brake system, the combination of a brake-piston cylinder, an auxiliary reservoir, a main train or brake pipe, an auxiliary emergency-reservoir, a main service-valve, having a passage in the chest or casing leading from the main train or brake pipe to the porous bushing forming the piston-cylinder, operative means so adapted to admit fluid under pressure independent of any other piston or flexible diaphragm, directly from the main train or brake pipe, to the piston-cylinder, main-service-valve chamber, auxiliary reservoir and brake-piston cylinder, continuously for any length of time desired, means operated by a reduction of fluid under pressure in the main train or brake pipe, the flow will continue until the fluid under pressure in the main train or brake pipe has been exhausted, substantially as set forth.

43. In a quick-action automatic fluid-pressure brake system, the combination of a brake-piston cylinder, an auxiliary reservoir, a main train or brake pipe, an auxiliary emergency-reservoir, a main service-valve, having passages in the chest or casing leading from an auxiliary emergency-reservoir to the porous bushing forming the piston-cylinder, operative means to admit fluid under pressure in excess of the normal fluid under pressure in the main train or brake pipe, from said emergency-reservoir through the porous bushing into the piston-cylinder, main-service-valve chamber, auxiliary reservoir and brake-piston cylinder, means so adapted that they are operated independent of any other piston or flexible diaphragm, to shift its full limit of travel by a reduction of fluid under pressure in the main train or brake pipe, in an emergency application of the brakes, continuously for any length of time desired, without resistance of fluid under pressure, and until all of the fluid under pressure has been exhausted in the main train or brake pipe, substantially as set forth.

44. In a quick-action automatic fluid-pressure brake system, the combination of a brake-piston cylinder, an auxiliary reservoir, a main train or brake pipe, an auxiliary emergency-reservoir, a main service-valve, having operative means so adapted independent of any other similar means or a flexible diaphragm to admit fluid under pressure from the main train or brake pipe through a porous bushing forming a piston-cylinder, and through an automatic-governor-valve chamber, to the main-service-valve chamber and auxiliary reservoir, while the main service-valve is being held to its seat, said porous portions of the piston-cylinder will continue to communicate with the piston-cylinder between the main train or brake pipe and the piston in said cylinder, until a reduction of fluid under pressure in the main train or brake pipe sufficiently to cause the piston to shift over the porous portion of the piston-cylinder; then the pores in said cylinder are between the piston and the main-service-valve chamber, then the porous portions of the piston-cylinder open communication between the main train or brake pipe and the brake-piston cylinder; substantially as set forth.

45. In a quick-action automatic fluid-pressure brake system, the combination of a brake-piston cylinder, an auxiliary reservoir, a main train or brake pipe, a main service-valve, a system to open the exhaust without the resistance of spring-pressure, and will continue to remain open when the main service-valve is in its normal position, without fluid-pressure acting or pressing against the driving-piston, having piston means so adapted in a main service and emergency valve device, independent of any other piston or flexible diaphragm, when said piston in the piston-cylinder porous bushing, is shifted to only an emergency position, it opens communication through the piston-cylinder porous bushing with the auxiliary emergency-reservoir, and the main train or brake pipe, to admit the flow of fluid under pressure in the auxiliary emergency-reservoir, and main train or brake pipe, directly through a check-valve, piston-cylinder porous bushing and the main-service-valve chamber, to the duplex-leakage-valve chamber thence to the brake-piston cylinder, means to increase the fluid-pressure in the auxiliary emergency-reservoir above that of the main-service-valve chamber and auxiliary reservoir before a reduction of fluid under pressure is made in the main train or brake pipe, causing an emergency application of the brakes continuously without resistance, until all the fluid under pressure has been exhausted in the main train or brake pipe and said reservoirs, substantially as set forth.

46. In a quick-action automatic fluid-pressure brake system, the combination of a brake-piston cylinder, an auxiliary reservoir, a main train or brake pipe, an auxiliary emergency-reservoir, a main service-valve, having provided for a porous or non-porous piston-cylinder bushing adapted to admit fluid under pressure from an auxiliary emergency-reservoir, the main train or brake pipe, through a check-valve, through the pores of the piston-cylinder, main-service-valve cylinder into the brake-piston cylinder, by a reduction of fluid under pressure in the main train or brake pipe, to cause the piston to make its full stroke, making an emergency application of the brakes, substantially as set forth.

47. In a quick-action automatic fluid-pressure brake system, the combination of a brake-piston cylinder, an auxiliary reservoir, a main train or brake pipe, an auxiliary emergency-reservoir, a main service-valve, having an automatic-governor air-brake valve with an automatic reducing-pressure valve, having access with an emergency-valve device on each side of the main service-valve, adapted to be operated at the time of an emergency application of the brakes by a reduction of fluid under pressure in the main train or brake pipe; substantially as set forth.

48. In a quick-action automatic fluid-pressure brake system, the combination of a brake-piston cylinder, an auxiliary reservoir, a main train or brake pipe, a main service-valve, having an emergency-valve and chamber so adapted to admit fluid under pressure from the auxiliary reservoir, storage-chamber, auxiliary emergency-reservoir, through the piston-cylinder porous bushing from the main train or brake pipe to a duplex-leakage-device chamber thence to the brake-piston cylinder, at an emergency application of the brakes by a reduction of fluid under pressure in the main train or brake pipe, means to retain the pressure in the auxiliary emergency-reservoir equal to or greater than normal pressure in the main train or brake pipe until the driving-piston is shifted to an emergency position, adapted to open emergency-valves on each side of the said piston to admit a free flow of pressure through the duplex-leakage-valve chamber into the brake-piston cylinder, substantially as set forth.

49. In a quick-action automatic fluid-pressure brake system, the combination of a brake-piston cylinder, an auxiliary reservoir, a main train or brake pipe, an auxiliary emergency-reservoir, a main service-valve, having an automatic-governor-valve chamber, so adapted to have access with the main service and emergency-valve chamber, with an automatic-governor-valve device, to reduce the fluid under pressure in the brake-valve passages, at the time of an application of the brakes, by an increase or decrease of fluid under pressure in the main train or brake pipe; substantially as set forth.

50. In a quick-action automatic fluid-pressure brake system, the combination of a brake-piston cylinder, an auxiliary reservoir, a main train or brake pipe, a main service-valve, having on each car or vehicle an automatic brake-valve, the tensions of governor-springs so adapted, to be compressed in an automatic governor device, against a valve seated, an operating-piston forming a wall or partition between the said springs and the valve-chamber adapted to operate means to close the exhaust-passage leading from the duplex leakage device and the brake-piston cylinder to the atmosphere, for any length of time desired when fluid under an excess pressure flows from the main train or brake pipe into said means, means operated in a passage leading from the main train or brake pipe to the main-service-valve chamber, to stop the flow of pressure when at a predetermined point from flowing into the main-service-valve chamber, from the main train or brake pipe, substantially as set forth.

51. In a quick-action automatic fluid-pressure brake system, the combination of a brake-piston cylinder, an auxiliary reservoir, a main train or brake pipe, a main service-valve, having on each car or vehicle in an automatic brake-valve the tensions of governor-springs so adapted to be compressed in an automatic governor device against the valve seated, a pressure-plate so adapted to have a spherical movement and forming a wall between the said springs in the valve-chamber, operative means in a passage leading from the main train or brake pipe, to the main-service-valve chamber to stop the flow of pressure when at a predetermined point from flowing into the main-service-valve chamber from the main train or brake pipe, when it is desirable to admit an excess of fluid under pressure from the main train or brake pipe through operative means into the duplex-leakage-valve chamber thence to the brake-piston cylinder, substantially as set forth.

52. In a quick-action automatic fluid-pressure brake system, the combination of a brake-piston cylinder, an auxiliary reservoir, a main train or brake pipe, a main service-valve, having in an automatic brake-valve piston, on each car or vehicle so adapted that the tension of spring-pressure in an automatic duplex governor device compressed between the valve normally seated and means to regulate the spring-pressure to any point desired in the governor-spring chamber to leak pressure to the atmosphere from a passage leading from the main-service-valve-chamber ports, to the brake-piston cylinder, or to the exhaust-retaining-valve chamber after the main service-valve is seated, substantially as set forth.

53. In a quick-action automatic fluid-pressure brake system, the combination of a brake-piston cylinder, an auxiliary reservoir, a main train or brake pipe, an auxiliary emergency-reservoir, a main service-valve, having an automatic governor-valve with passages leading to the main train or brake pipe, an emergency-valve chamber, storage-chamber, a main-service-valve chamber, auxiliary reservoir, brake-piston cylinder, an auxiliary emergency-reservoir, and check-valve chambers; substantially as set forth.

54. In a quick-action automatic fluid-pressure brake system, the combination of a brake-piston cylinder, an auxiliary reservoir, a main train or brake pipe, a main service-valve, a system to open the exhaust without the resistance of spring-pressure, and will continue to remain open when the main service-valve is in its normal position without fluid-pressure acting or pressing against the driving-piston, having automatic means in an emergency-valve to increase the fluid under pressure in the brake-piston cylinder at a service application of the brakes, by a reduction of fluid under pressure in the main train or brake pipe, means operative on either the auxiliary reservoir or main train or brake pipe side of the driving-piston adapted to admit simultaneously fluid-pressure from an auxiliary emergency-reservoir and the main train or brake pipe through the piston-cylinder porous bushing into the main-service-valve chamber through the emergency-port into a passage leading to the duplex leakage device thence to the brake-piston cylinder, substantially as set forth.

55. In a quick-action automatic fluid-pressure brake system, the combination of a brake-piston cylinder, an auxiliary reservoir, a main train or brake pipe, an auxiliary emergency-reservoir, a main service-valve, having an emergency-valve device so adapted to have access with excess fluid under pressure at all times and with an automatic-governor-retaining valve, and with a main train or brake pipe, also with the auxiliary reservoir, its movement or opening is free from a resistance of fluid under pressure from the auxiliary reservoir, brake-piston cylinder and main train or brake pipe, at the time of an emergency application of the brakes, by a reduction of fluid under pressure in the main train or brake pipe; substantially as set forth.

56. In a quick-action automatic fluid-pressure brake system, the combination of a brake-piston cylinder, an auxiliary reservoir, a main train or brake pipe, an auxiliary emergency-reservoir, a main service-valve, having piston means so adapted to move betweeen two emergency-valves at all times, and with open passages at all times to the main train or brake pipe, and at an emergency application of the brake with the auxiliary reservoir, main service-valve and auxiliary emergency-reservoir; substantially as set forth.

57. In a quick-action automatic fluid-pressure brake system, the combination of a brake-piston cylinder, an auxiliary reservoir, a main train or brake pipe, a main service-valve, having a graduating-port in an automatic duplex emergency-valve, in an emergency-valve chamber between the main train or brake pipe and the main-service-valve chamber, the other emergency-valve in the emergency-valve chamber between the driving-piston and the auxiliary reservoir, the emergency-valve between the main train or brake pipe and the main-service-valve chamber is so adapted to admit a quantity of fluid under pressure directly from the main train or brake pipe to the duplex-leakage-valve chamber thence to the brake-piston cylinder, while the other emergency-valve so adapted to admit fluid under pressure from an auxiliary emergency-reservoir to the said duplex-leakage-valve chamber and thence to the brake-piston cylinder, in an emergency application of the brakes, while the emergency-valve in the main train or brake pipe passage during a service application of the brakes by a reduction of fluid under pressure in the main train or brake pipe will admit a small quantity of fluid into the brake-piston cylinder, substantially as set forth.

58. In a quick-action automatic fluid-pressure brake system, the combination of a brake-piston cylinder, an auxiliary reservoir, a main train or brake pipe, a main service-valve, a duplex leakage device in a passage leading from the retaining-valve chamber to the brake-piston cylinder, having operative means in a main-service-valve device so adapted to make both a service and emergency application of the brakes, without any resistance of pressure when the fluid under pressure is greater in the main train or brake pipe than in the main-service-valve chamber, the application is made by a reduction of fluid under pressure in the main train or brake pipe, independent of any other piston means or a flexible diaphragm, operative means to increase the fluid under pressure in an auxiliary emergency-reservoir above that of the main-service-valve chamber and auxiliary reservoir before an application of the brakes is made by a reduction of fluid under pressure in the main train or brake pipe, substantially as set forth.

59. In a quick-action automatic fluid-pressure brake system, the combination of a brake-piston cylinder, an auxiliary reservoir, a main train or brake pipe, an auxiliary emergency-reservoir, a main service-valve, having operative means to perpetuate an equalization of fluid under pressure, after an application of the brakes by a reduction of fluid under pressure in the main train or brake pipe, to any length of time desired, with the fluid under pressure in the brake-piston cylinder, main-service-valve chamber, auxiliary reservoir, emergency-valve chambers, auxiliary emergency-reservoir, storage-chamber, and all other passages and chambers in the system, substantially as set forth.

60. In a quick-action automatic fluid-pressure brake system, the combination of a brake-piston cylinder, an auxiliary reservoir, a main train or brake pipe, an auxiliary emergency-reservoir, a main service-valve, having normal open passages leading from the main train or brake pipe to an auxiliary emergency-reservoir, said passages are so adapted to be closed by the main-service-valve piston, by a reduction of fluid under pressure in the main train or brake pipe, causing the fluid to flow into the brake-piston cylinder, independent of any other piston, or a flexible diaphragm, thus perpetuating an emergency application of the brakes; substantially as set forth.

61. In a quick-action automatic fluid-pressure brake system, the combination of a brake-piston cylinder, an auxiliary reservoir, a main train or brake pipe, an auxiliary emergency-reservoir, a main service-valve, having operative means to admit fluid under pressure directly from the main train or brake pipe through the driving-piston cylinder, into the main-service-valve chamber, auxiliary reservoir, and brake-piston cylinder, by a reduction of fluid under pressure in the main train or brake pipe to cause the piston to shift its full limit in the piston-cylinder; substantially as set forth.

62. In a quick-action automatic fluid-pressure brake system, the combination of a brake-piston cylinder, an auxiliary reservoir, a main train or brake pipe, an auxiliary emergency-reservoir, a main service-valve, having operative means to admit fluid under pressure directly through the driving-piston cylinder, during an application of the brakes, by a reduction of fluid under pressure in the main train or brake pipe, substantially as set forth.

63. In a quick-action automatic fluid-pressure brake system, the combination of a brake-piston cylinder, an auxiliary reservoir, a main train or brake pipe, an auxiliary emergency-reservoir, a main service-valve, having means so adapted in a main service-valve device that the piston in the piston-cylinder, uncovers ports in the cylinder leading to the auxiliary emergency-reservoir, main train or brake pipe, to admit the flow of fluid under pressure directly from the auxiliary emergency-reservoir, main train or brake pipe, through a check-valve device, piston-cylinder through the main-service-valve chamber, into the brake-piston cylinder, by a reduction of fluid under pressure in the main train or brake pipe, causing an emergency application of the brakes continuously for any length of time desired, without resistance of fluid under pressure, and until all of the fluid under pressure has been exhausted in the main train or brake pipe; substantially as set forth.

64. In a quick-action automatic fluid-pressure brake system, the combination of a brake-piston cylinder, an auxiliary reservoir, a main train or brake pipe, a main service-valve, having a greater pressure area on the auxiliary reservoir side to cause a quick action of the main service-valve in making an application of the brakes, by reducing the fluid under pressure in the main train or brake pipe below the fluid under pressure in the main-service-valve chamber and auxiliary reservoir, substantially as set forth.

65. In a quick-action automatic fluid-pressure brake system, the combination of a brake-piston cylinder, an auxiliary reservoir, a main train or brake pipe, a main service-valve, a duplex leakage device to reduce the pressure when it is greater than desired in a passage leading from the main-service-valve bushing to the brake-piston cylinder, having a valve device automatically governing to any predetermined point of pressure desired in the main-service-valve chamber after the main service-valve has been shifted to a released position, opening communications between the brake-piston cylinder thence through the duplex leakage device to the retaining-valve chamber, so the pressure of fluid therein is equal to normal fluid-pressure in the main train or brake pipe, substantially as set forth.

66. In a quick-action automatic fluid-pressure brake system, the combination of a brake-piston cylinder, an auxiliary reservoir, a main train or brake pipe, an auxiliary emergency-reservoir, a main service-valve, having a valve device automatically closing an exhaust-passage, leading from the brake-piston cylinder to the atmosphere, perpetuating an application of the brakes, any length of time desired, or at a time when the fluid under pressure in the main-service-valve chamber, and auxiliary reservoir is equal, which pressure being less than that in the main train or brake pipe, substantially as set forth.

67. In a quick-action automatic fluid-pressure brake system, the combination of a brake-piston cylinder, an auxiliary reservoir, a main train or brake pipe, a main service-valve, a duplex leakage device, having regulating means to regulate the shifting of the driving-piston so that the traverse of the piston is not as long in a service as in an emergency application, said means to stop the piston between the pores in the piston-cylinder bushing and the inner end of the cylinder for a service application, while in an emergency application the piston moves such means from its seat so as to be shifted over the pores and opens emergency-valve device on one or both sides of the driving-piston, which will admit fluid-pressure from an auxiliary reservoir, an auxiliary emergency-reservoir, and the main train or brake pipe into the brake-piston cylinder, said piston will be shifted to an emergency position only when it is desirable to make an emergency application of the brakes, by a reduction of fluid under pressure in the main train or brake pipe, means to have a greater pressure in the main train or brake pipe than that in the main-service-valve chamber, substantially as set forth.

68. In a quick-action automatic fluid-pressure brake system, the combination of a brake-piston cylinder, an auxiliary reservoir, a main train or brake pipe, a main service-valve, a duplex leakage device to reduce the pressure in a passage leading from the brake-piston cylinder to the retaining-valve chamber when the retaining-valve is closed by an excess of fluid under pressure in the main train or brake pipe, passages between the said parts, and automatic operative means for admitting or maintaining a predetermined fluid under pressure or pressures in the main-service-valve chamber, said means being operative by fluid under pressure in the main-service-valve chamber or from the main train or brake pipe passages, when the main service-valve has been shifted to a released position before or after the retaining-valve is closed, substantially as set forth.

69. In a quick-action automatic fluid-pressure brake system, the combination of a brake-piston cylinder, an auxiliary reservoir, a main train or brake pipe, a main service-valve, having retaining devices for closing the exhaust from the brake-piston cylinder by excess fluid under pressure above normal main train or brake pipe pressure, and so adapted to keep fluid under pressure in the brake-piston cylinder any length of time desired, and not retarding the release of any fluid under pressure from the brake-piston cylinder to atmosphere, at a service application after the main service-valve is shifted to a released position, substantially as set forth.

70. In a quick-action automatic fluid-pressure brake system, the combination of a brake-piston cylinder, an auxiliary reservoir, a main train or brake pipe, a main service-valve, with an automatic governor-valve adapted to be operated by excess fluid under pressure above normal main train or brake pipe pressure, and adapted to close the exhaust from the brake-piston cylinder, and so adapted to keep fluid under pressure in the brake-piston cylinder any length of time desired, and not retarding the release of any fluid under pressure from the brake-piston cylinder to atmosphere, at a service application after the main service-valve is shifted to a released position, substantially as set forth.

71. In a quick-action automatic fluid-pressure brake system, the combination of a brake-piston cylinder, an auxiliary reservoir, a main train or brake pipe, a main service-valve, with an automatic governor-valve adapted to be operated by excess fluid under pressure above normal main train or brake pipe pressure, and the passage leading from the main train or brake pipe to the governor-valve device, whereby the exhaust from the brake-piston cylinder may be closed, and a brake application may be perpetuated, and so adapted to keep fluid under pressure in the brake-piston cylinder any length of time desired and not retarding the release of any fluid under pressure from the brake-piston cylinder to atmosphere, at a service application of the brakes, after the main service-valve is shifted to a released position, substantially as set forth.

72. In a quick-action automatic fluid-pressure brake system, the combination of a brake-piston cylinder, an auxiliary reservoir, a main train or brake pipe, a main service-valve, which controls the flow of fluid under pressure from the auxiliary reservoir, main train or brake pipe, to the brake-piston cylinder and exhaust therefrom, and a governor-valve adapted to be so operated by excess fluid-pressure from the main train or brake pipe to keep fluid under pressure in the brake-piston cylinder any length of time desired, and not retarding the release of any fluid under pressure from the brake-piston cylinder to atmosphere, at a service application of the brakes, after the main service-valve is shifted to a release position, substantially as set forth.

73. In a quick-action automatic fluid-pressure brake system, the combination of a brake-piston cylinder, an auxiliary reservoir, a main train or brake pipe, a main service-valve, a brake-piston cylinder connected with normal open exhaust-passages to the atmosphere, an automatic-governor-valve mechanism independent of the auxiliary reservoir, and disconnected therefrom, for automatically closing said passages when the fluid under pressure in the main train or brake pipe exceeds the fluid under pressure in the auxiliary reservoir, and adapted to keep fluid under pressure in the brake-piston cylinder any length of time desired and not retarding the release of any fluid under pressure from the brake-piston cylinder to atmosphere, at a service application of the brakes, after the main service-valve is shifted to a released position, substantially as set forth.

74. In a quick-action automatic fluid-pressure brake system, the combination of a brake-piston cylinder, an auxiliary reservoir, a main train or brake pipe, and a main service-valve, an automatic-governor-retaining valve independent of the auxiliary reservoir, and exhaust-passage leading through the main service-valve from the brake-piston cylinder and adapted to act without affecting the normal conditions of the main service-valve and driving-piston, a retaining-valve mechanism adapted to close the exhaust-passage from the brake-piston cylinder to atmosphere any time while the main service-valve is in its normal position and the fluid under pressure in the main-service-valve chamber is less than that in the main train or brake pipe, substantially as set forth.

75. In a quick-action automatic fluid-pressure brake system, the combination of a brake-piston cylinder, an auxiliary reservoir, a main train or brake pipe, a main service-valve, an automatic governor-valve governing the fluid under pressure any time while the main service-valve is in its normal position and a valve adapted to admit a higher fluid-pressure from the auxiliary reservoir, auxiliary emergency-reservoir, than a service application into the brake-piston cylinder, when the fluid under pressure from the main train or brake pipe is cut off from the governor-valve device through an always-open passage to and into the auxiliary reservoir by the movement of the main service and emergency valves, substantially as set forth.

76. In a quick-action automatic fluid-pressure brake system, the combination of a brake-piston cylinder, an auxiliary reservoir, a main train or brake pipe, a main service-valve, a duplex leakage device in a passage leading from the brake-piston cylinder to the retaining-valve chamber, said device having duplex means to, cause a graduated reduction of fluid under pressure in an always-open passage between the main-service-valve bushing and the brake-piston cylinder, an always-open passage between the auxiliary reservoir and the main-service-valve chamber for a free flow of fluid under pressure to operate the main service-valve, to make an application of the brakes by a reduction of fluid under pressure in the main train or brake pipe, such reductions of pressure in the main train or brake pipe may be made any time after the main-service-valve chamber has been cut off from the main train or brake pipe, to make a service or emergency application of the brakes, during the emergency application the fluid under pressure from the main train or brake pipe flows through the piston-cylinder porous bushing into and through the duplex leakage device thence to the brake-piston cylinder without any resistance, substantially as set forth.

77. In a quick-action automatic fluid-pressure brake system, the combination of a brake-piston cylinder, an auxiliary reservoir, a main train or brake pipe, a main service-valve, means to admit fluid under pressure from the main train or brake pipe, through a piston-cylinder porous bushing into the main-service-valve chamber, auxiliary reservoir, passages leading to a duplex leakage-valve device and thence to the brake-piston cylinder, having reservoir means to reserve quantity of fluid under pressure, said pressure being equal to or greater than the normal fluid-pressure in the main train or brake pipe, which shall be subject only to emergency application of the brakes, and by means of which a greater emergency fluid-pressure may be applied, than from the auxiliary reservoir to and maintained in the brake-piston cylinder, subject to the duplex leakage device, than the fluid under pressure in the main train or brake pipe, in an application of the brakes, made by a reduction of fluid under pressure in the main train or brake pipe, means to increase the fluid under pressure in the auxiliary emergency-reservoir above that pressure in the main-service-valve chamber when an excess of fluid under pressure is in the main train or brake pipe, substantially as set forth.

78. In a quick-action automatic fluid-pressure brake system, the combination of a brake-piston cylinder, an auxiliary reservoir, a main train or brake pipe, a main service-valve, a duplex leakage device to reduce the pressure when it is greater than desired in a passage leading from the brake-piston cylinder through underneath the main service slide-valve into the retaining-valve chamber after the retaining-valve has been closed by an excess of fluid under pressure in the main train or brake pipe, having a passage leading from the main train or brake pipe to the main-service-valve chamber through a governor-valve device, having slide-valve means adapted to be operated in an automatic-governor-valve mechanism cutting off the flow of fluid-pressure from the main train or brake pipe to the main-service-valve chamber, before the retaining-valve closes the passage leading from the brake-piston cylinder to the atmosphere, said valve operative by an excess of fluid under pressure in the main train or brake pipe, any time while the fluid in the main-service-valve chamber is less than that in the main train or brake pipe, subtantially as set forth.

79. In a quick-action automatic fluid-pressure brake system, the combination of a brake-piston cylinder, an auxiliary reservoir, a main train or brake pipe, and a main service-valve, having slide-valve means adapted to be moved by pressure to admit fluid under pressure against the retaining-valve closing the exhaust from the brake-piston cylinder, any time while the main service-valve is in its normal position, and the fluid under pressure in the main-service-valve chamber and auxiliary reservoir is less than that in the main train or brake pipe, substantially as set forth.

80. In a quick-action automatic fluid-pressure brake system, the combination of a brake-piston cylinder, an auxiliary reservoir, a main train or brake pipe and a main service-valve, having slide-valve means adapted to be moved by pressure acting against the pressure-plate, to admit fluid under pressure into the brake-piston cylinder any time while the main service-valve is in its normal position, and the retaining-valve has closed the exhaust from the brake-piston cylinder, while the fluid under pressure in the main-service-valve chamber is less than that in the main train or brake pipe, substantially as set forth.

81. In a quick-action automatic fluid-pressure brake system, the combination of a brake-piston cylinder, an auxiliary reservoir, a main train or brake pipe, and a main service-valve, having automatic means to hold the main service-valve subject to a service or emergency application of the brakes, so that the fluid under pressure in the main-service-valve chamber and auxiliary reservoir is less than that in the main train or brake pipe, when a reduction of fluid under pressure in the main train or brake pipe is such to cause the fluid to flow through an always-open passage from the auxiliary reservoir, into the main-service-valve chamber, acting or pressing against the driving-piston making an application of the brakes, by a reduction of fluid under pressure in the main train or brake pipe, substantially as set forth.

82. In a quick-action automatic fluid-pressure brake system, the combination of a brake-piston cylinder, an auxiliary reservoir, a main train or brake pipe, a main service-valve, having means so adapted that forms a wall or partition between pressures, movable only by an excess pressure on the one side greater than that on the other side, such movement opens a passage leading from the source of fluid-pressure into the chamber containing means to close the passage leading from the main train or brake pipe to the main-service-valve chamber, having means so adapted in a pressure-plate movable between pressures, so that when the excess pressure is greater than the pressure on the opposite side of said plate, it opens a passage leading into a chamber containing means to close the exhaust-passage leading from the brake-piston cylinder to the atmosphere, substantially as set forth.

83. In a quick-action automatic fluid-pressure brake system, the combination of a brake piston cylinder, an auxiliary reservoir, a main train or brake pipe, a main service-valve, having valve means on both sides of the driving-piston to cause an emergency application of the brakes, to act simultaneously by a reduction of fluid under pressure in the main train or brake pipe, duplex leakage means in a passage leading from the main train or brake pipe, main-service-valve-chamber bushing, to the brake-piston cylinder, to reduce the pressure flowing into the brake-piston cylinder if greater than desired, substantially as set forth.

84. In a quick-action automatic fluid-pressure brake system, the combination of a brake-piston cylinder, an auxiliary reservoir, a main train or brake pipe, a main service-valve, having a valve device adapted to control the fluid under pressure in the main-service-valve chamber, when the pressure in the main train or brake pipe is at any excess of pressure desired, with an always-open passage between the main service-valve and the auxiliary reservoir, said means closing communication between the main train or brake pipe and the main-service-valve chamber, any time after the main service-valve is in its normal position, means to admit to atmosphere any excess of fluid-pressure in the main-service-valve chamber that may leak past the driving-piston into said main-service-valve chamber, substantially as set forth.

85. In a quick-action automatic fluid-pressure brake system, the combination of a brake-piston cylinder, an auxiliary reservoir, a main train or brake pipe, and a main service-valve, having means adapted to admit to atmosphere any excess of fluid under pressure in the main-service-valve chamber and auxiliary reservoir, above the normal fluid under pressure in the main train or brake pipe, which excess may be caused by leakage past the driving-piston, substantially as set forth.

86. In a quick-action automatic fluid-pressure brake system, the combination of a brake-piston cylinder, an auxiliary reservoir, a main train or brake pipe, and a main service-valve, having means adapted at an emergency application of the brakes to admit fluid under pressure directly from the main train or brake pipe in and through both ends of the main service-valve to the brake-piston cylinder, the means operated by a reduction of fluid under pressure in the main train or brake pipe, substantially as set forth.

87. In a quick-action automatic fluid-pressure brake system, the combination of a brake-piston cylinder, an auxiliary reservoir, a main train or brake pipe, and a main service-valve, having means adapted to vent the main-service-valve chamber so that the fluid under pressure therein, will not be above the normal fluid under pressure in the main train or brake pipe when an excess of fluid under pressure is established in the main train or brake pipe, to close the retaining-valve device, any time while the main service-valve is in its normal position, substantially as set forth.

88. In a quick-action automatic fluid-pressure brake system, the combination of a brake-piston cylinder, an auxiliary reservoir, a main train or brake pipe, and a main service-valve, having the porous driving-piston cylinder, so adapted to admit fluid directly from the main train or brake pipe, through the pores into the brake-piston cylinder, only when the driving-piston is shifted to an emergency position, substantially as set forth.

89. In a quick-action automatic fluid-pressure brake system, the combination of a brake-piston cylinder, an auxiliary reservoir, a main train or brake pipe, and a main service-valve, having means adapted to admit a small quantity of fluid under pressure directly from the main train or brake pipe to the brake-piston cylinder, during the time of a service application of the brakes, substantially as set forth.

90. In a quick-action automatic fluid-pressure brake system, the combination of a brake-piston cylinder, an auxiliary reservoir, a main train or brake pipe, a main service-valve, having a valve device governing the fluid under pressure in the main-service-valve chamber any time after the main service-valve is in its normal position, the device is so adapted that after it cuts off the flow of pressure from flowing into the main-service-valve chamber, from the main train or brake pipe, there may be a service or emergency application of the brakes, made by a reduction of fluid under pressure in the main train or brake pipe, and if such application is greater than desired the pressure may be reduced while flowing into the brake-piston cylinder, by duplex leakage means to any predetermined point desired, substantially as set forth.

91. In a quick-action automatic fluid-pressure brake system, the combination of a brake-piston cylinder, an auxiliary reservoir, a main train or brake pipe, a main service-valve, having means to regulate the travel of an emergency-valve rod, to shift the emergency-valve only at the emergency application of the brakes, and to admit fluid under pressure from the main train or brake pipe through the piston-cylinder porous bushing, into the main-service-valve chamber through a passage into a reducing-valve chamber, thence to the brake-piston cylinder, an always-open passage between the auxiliary reservoir and main-service-valve chamber, an always-open passage between the main-service-valve bushing through a duplex leakage device into the brake-piston cylinder, substantially as set forth.

92. In a quick-action automatic fluid-pressure brake system, the combination of a brake-piston cylinder, an auxiliary reservoir, a main train or brake pipe, and a main service-valve, having means adapted to admit through the main-service-valve chamber, fluid under pressure directly from the main train or brake pipe to the brake-piston cylinder, independent of any flexible diaphragm, substantially as set forth.

93. In a quick-action automatic fluid-pressure brake system, the combination of a brake-piston cylinder, an auxiliary reservoir, a main train or brake pipe, a main service-valve, having governor-piston means so adapted to operate a governor-valve, to admit fluid under pressure from the main train or brake pipe into a passage leading to a duplex leakage device, thence to the brake-piston cylinder, after said governor-piston is forced from its seat, by excess fluid under pressure from the main train or brake pipe, any time while the main service-valve is in its normal position, being cut off from the main train or brake pipe, and a retaining-valve closing the exhaust-passage leading from the duplex-leakage-valve chamber, and from the brake-piston cylinder to atmosphere, substantially as set forth.

94. In a quick-action automatic fluid-pressure brake system, the combination of a brake-piston cylinder, an auxiliary reservoir, a main train or brake pipe, and a main service-valve, a duplex leakage device, having means so adapted on each car or vehicle to govern the fluid under pressure to any desired point in the main-service-valve chamber of the air-brake system, at any time while the main service-valve is in its normal position, with an excess of fluid under pressure in the main train or brake pipe, the same being cut off from flowing through said governor device into the main-service-valve chamber, from the main train or brake pipe, means in a valve device so adapted to admit to atmosphere any excess of pressure in the main-service-valve chamber when there is an excess of pressure above the normal in the main train or brake pipe, substantially as set forth.

95. In a quick-action automatic fluid-pressure brake system, the combination of a brake-piston cylinder, an auxiliary reservoir, a main train or brake pipe, and a main service-valve, having means so adapted on each car or vehicle, to close an exhaust-passage leading from the brake-piston cylinder, to atmosphere by fluid under pressure from the system, any time while the main service-valve is in its normal position, and the fluid in the main-service-valve chamber, and auxiliary reservoir, is being governed to any predetermined point desired less than that pressure in the main train or brake pipe, substantially as set forth.

96. In a quick-action automatic fluid-pressure brake system, the combination of a brake-piston cylinder, an auxiliary reservoir, a main train or brake pipe, a main service-valve, having in a supplemental valve a retaining-pressure mechanism operated only by an excess of fluid under pressure in the main train or brake pipe on each car or vehicle, a valve held to its seat under spring-pressure, to be opened only by an excess fluid-pressure of equal amount in the valve-chamber, said excess flowing from the main train or brake pipe, after said valve is open the fluid passes through the opening acting on a valve device closing the exhaust-passage, leading from the duplex leakage device and brake-piston cylinder to the atmosphere, also the excess pressure from the main train or brake pipe, opens communication between the main train or brake pipe, duplex leakage device, and brake-piston cylinder, for any length of time desired, or as long as an excess pressure is in the main train or brake pipe, sufficiently to close communications between the main train or brake pipe, and the main-service-valve chamber, substantially as set forth.

97. In a quick-action automatic fluid-pressure brake system, the combination of a brake-piston cylinder, an auxiliary reservoir, a main train or brake pipe, a main service-valve, having means in a governor-valve device so adapted to admit all the fluid under pressure from the main train or brake pipe, while it is at a normal point, through said device into the main-service-valve chamber while said service-valve is in its normal position, the valve device is being held to its seat under spring-pressure to be opened only by pressure when at a predetermined point in the main-service-valve chamber, or the main train or brake pipe passages, when said pressure raises the pressure-plate unseating the valve the fluid passes through the opening in the valve-chamber, acting on a piston-valve mechanism, governing the fluid under pressure in the main-service-valve chamber, to normal pressure in the main train or brake pipe, any time while the main service-valve is in its normal position, simultaneously cutting off communication between the main train or brake pipe and the main-service-valve chamber, substantially as set forth.

98. In a quick-action automatic fluid-pressure brake system, the combination of a brake-piston cylinder, an auxiliary reservoir, a main train or brake pipe, and a main service-valve, having in a valve device, a valve held to its seat under spring-pressure, to be opened only by a fluid-pressure of equal amount, the fluid passes through the opening to and into the brake-piston cylinder, perpetuating a brake application or makes an application of the brakes, any time while the main service-valve is in its normal position, substantially as set forth.

99. In a quick-action automatic fluid-pressure brake system, the combination of a brake-piston cylinder, an auxiliary reservoir, a main train or brake pipe, and a main service-valve, having means so adapted in a valve device, simultaneously closing the exhaust-passage leading from the brake-piston cylinder, to atmosphere, and admitting fluid under pressure directly from the main train or brake pipe, to the brake-piston cylinder, any length of time desired, perpetuating an application of the brakes or making an application, substantially as set forth.

100. In a quick-action automatic fluid-pressure brake system, the combination of a brake-piston cylinder, an auxiliary reservoir, a main train or brake pipe, a main service-valve, having duplex means to reduce an excess of pressure in the exhaust-passage leading from the brake-piston cylinder, and the retaining-valve chamber when an excess of fluid under pressure is in the main train or brake pipe, means so adapted to close the exhaust-passage or retaining-valve chamber leading from the duplex device and brake-piston cylinder to the atmosphere, with the same excess of fluid under pressure above the normal that is in the main train or brake pipe, after the flow of pressure in the main train or brake pipe has been cut off from flowing into the main-service-valve chamber, the main service-valve being held to its seat, an always-open passage between the main-service-valve chamber and the auxiliary reservoir before or after an application of the brakes, an always-open passage between the main-service-valve ports through a duplex leakage-chamber and the brake-piston cylinder, substantially as set forth.

101. In a quick-action automatic fluid-pressure brake system, the combination of a brake-piston cylinder, an auxiliary reservoir, a main train or brake pipe, and a main service-valve, having means so adapted, after a service application of the brakes, to cause the main service-valve to retract its movement, by fluid under pressure, the same fluid under pressure being an excess pressure, simultaneously acting on a valve closing the exhaust-passage leading from the brake-piston cylinder to atmosphere, without any loss of fluid under pressure in the brake-piston cylinder, and being held closed any length of time desired, substantially as set forth.

102. In a quick-action automatic fluid-pressure brake system, the combination of a brake-piston cylinder, an auxiliary reservoir, a main train or brake pipe, a main service-valve, having means so adapted to make a repeated application of the brakes, with excess pressure in the main train or brake pipe, closing the exhaust-passage leading from the leakage-valve device and the brake-piston cylinder, also cutting off communications between the main train or brake pipe, and the main-service-valve chamber before a repeated application is made, the fluid under pressure in the main-service-valve chamber being less than that in the main train or brake pipe, by means operating to cause such results, means to reduce the pressure in said main-service-valve chamber when it becomes greater than a desired point of pressure, substantially as set forth.

103. In a quick-action automatic fluid-pressure brake system, the combination of a brake-piston cylinder, an auxiliary reservoir, a main train or brake pipe, a main service-valve, a duplex leakage device, having means so adapted to close the exhaust-passage leading from a duplex leakage-chamber and brake-piston cylinder, to the atmosphere with an excess of pressure in the main train or brake pipe that is above the normal in said main train or brake pipe, for any length of time desired after said excess pressure in the main train or brake pipe is cut off from flowing into the main-service-valve chamber, said means is also adapted to admit fluid under pressure directly from the main train or brake pipe to the brake-piston cylinder, after the exhaust-passage is closed, the said excess pressure in the main train or brake pipe also operates means to cut off communication between the main-service-valve chamber, and the main train or brake pipe, the main service-valve subject to an application of the brakes by a reduction of fluid under pressure in the main train or brake pipe, substantially as set forth.

104. In a quick-action automatic fluid-pressure brake system, the combination of a brake-piston cylinder, an auxiliary reservoir, a main train or brake pipe, a main service-valve, an always-open passage between the main service-valve and the auxiliary reservoir, an always-open passage between the main-service-valve ports and on the brake-piston cylinder, having duplex leakage means in a passage leading from the main train or brake pipe to the brake-piston cylinder, said passage is open after the main-service-valve chamber is cut off from the main train or brake pipe, means controlling the fluid under pressure in the main-service-valve chamber, duplex means so adapted that valves are being held to their seats under spring-pressure to be opened only by a fluid under pressure of equal amount or a little in excess, which amount is an excess of normal train or brake pipe pressure, to admit such excess fluid under pressure through the said open passage to the brake-piston cylinder to make or perpetuate an application of the brakes, as long as desired, such excess pressure flows from the main train or brake pipe, after the flow of pressure from the main train or brake pipe, has been cut off from flowing into the main-service-valve chamber, means to close an exhaust-passage leading from the duplex leakage device and the brake-piston cylinder to the atmosphere, means operated by an excess pressure as the fluid under pressure passes through said passage leading from the main train or brake pipe through the retaining-valve mechanism into the brake-piston cylinder, substantially as set forth.

105. In a quick-action automatic fluid-pressure brake system, the combination of a brake-piston cylinder, an auxiliary reservoir, a main train or brake pipe, a main service-valve, in an always-open passage between the main-service-valve ports and the brake-piston cylinder, an always-open passage between the main service-valve and the auxiliary reservoir, an open passage between the duplex leakage device through underneath the main service slide-valve to the retaining-valve chamber, after the main service-valve is in its normal position, said leakage device adapted to reduce the pressure in said open passage, when an excess of pressure in the main train or brake pipe, closes the exhaust-passage from the brake-piston cylinder to atmosphere, the same excess pressure operates means to control the pressure in the main-service-valve chamber, so that only a predetermined amount of fluid under excess pressure in the main train or brake pipe may be admitted into the main-service-valve chamber, having a passage leading from an auxiliary emergency-reservoir, and through the piston-cylinder porous bushing from the main train or brake pipe to the said duplex leakage device and the brake-piston cylinder, means so adapted that a valve is being held to its seat under spring-pressure to be opened only by fluid under pressure of equal amount to admit fluid under pressure from said passages to the atmosphere, the means controlling the fluid under pressure in the main-service-valve chamber, will close communications between the main train or brake pipe and said chamber, while an excess of fluid under pressure is flowing into the auxiliary emergency-reservoir, substantially as set forth.

106. In a quick-action automatic fluid-pressure brake system, the combination of a brake-piston cylinder, an auxiliary reservoir, a main train or brake pipe, a main service-valve, an always-open passage between the main-service-valve ports through a duplex leakage device into the brake-piston cylinder, an always-open passage between the main-service-valve chamber and the auxiliary reservoir, for a free flow of pressure during an application of the brakes to shift the main-service-valve driving-piston, having an emergency-valve adapted to be operated by the main-service-valve device when a reduction of fluid under pressure is made in the main train or brake pipe, said emergency-valve adapted to admit fluid under pressure from the main train or brake pipe into and through a duplex leakage device thence to the brake-piston cylinder, without resistance of fluid under pressure and continuously for any length of time desired, or until the fluid under pressure in the main train or brake pipe is exhausted, said duplex means will reduce the fluid under excess pressure flowing from the main train or brake pipe through a retaining-valve mechanism, after said retaining-valve mechanism has closed the exhaust-passage, into said duplex leakage device, thence to the brake-piston cylinder, means adapted to close communications between the main train or brake pipe, and the main-service-valve chamber, said means are operated by the excess pressure in the main train or brake pipe, substantially as set forth.

107. In a quick-action automatic fluid-pressure brake system, the combination of a brake-piston cylinder, an auxiliary reservoir, a main train or brake pipe, a main service-valve, operative means to admit fluid under pressure from the main train or brake pipe to the duplex-leakage-valve device, thence to the brake-piston cylinder, means to cut off the flow of fluid from the main train or brake pipe, from flowing into the main-service-valve chamber, means to close the exhaust-passage leading from the duplex means and the brake-piston cylinder, through said duplex means to atmosphere, while the main service-valve opens communications between the leakage device, the brake-piston cylinder, and the exhaust-retaining-valve chamber, substantially as set forth.

108. In a quick-action automatic fluid-pressure brake system, the combination of a brake-piston cylinder, an auxiliary reservoir, a main train or brake pipe, a main service-valve, having in an air-brake system means on each car or vehicle, to operate when there is an excess of fluid under pressure in the main train or brake pipe, to close the exhaust-passage leading from the brake-piston cylinder, through a duplex-leakage-valve chamber and a retaining-valve chamber to the atmosphere, any time when the main service-valve is in an exhaust or any other position, thus perpetuating an application of the brakes for any length of time desired, after the fluid under pressure is under control in the main-service-valve chamber, so it is less than that pressure in the main train or brake pipe, substantially as set forth.

109. In a quick-action automatic fluid-pressure brake system, the combination of a brake-piston cylinder, an auxiliary reservoir, a main train or brake pipe, a main service-valve, having duplex means in a fluid-pressure system to reduce the fluid-pressure in a passage leading from the brake-piston cylinder to a closed retaining-valve chamber, on each car or vehicle, when the main-service-valve chamber is cut off from the main train or brake pipe, and the air-charged reservoir on a locomotive is in communication with each brake-piston cylinder of the system, on each car or vehicle, thus perpetuating an application of the brakes any length of time desired with an excess of fluid under pressure in the main train or brake pipe, substantially as set forth.

110. In a quick-action automatic fluid-pressure brake system, the combination of a brake-piston cylinder, an auxiliary reservoir, a main train or brake pipe, a main service-valve, having means in a fluid-pressure brake system when operated on each car or vehicle, will admit fluid under excess pressure to a duplex-leakage-device chamber, thence to the brake-piston cylinder from the main train or brake pipe above that pressure in the main-service-valve chamber, means to close an exhaust-passage leading from the said leakage-chamber and brake-piston cylinder to atmosphere, with the same excess fluid-pressure, that is being admitted to passages leading to the duplex-leakage-valve chamber and brake-piston cylinder, the duplex means when operated will reduce such excess pressure in said passage and chambers, to any predetermined point desired, also in the passages leading from the main-service-valve ports to the said leakage-valve chamber, and to the closed retaining-valve chamber, substantially as set forth.

111. In a quick-action automatic fluid-pressure brake system, the combination of a brake-piston cylinder, an auxiliary reservoir, a main train or brake pipe, a main service-valve, having duplex leakage means in the fluid-pressure brake system on each car or vehicle, with an always-open passage leading from the main-service-valve-chamber ports to the brake-piston cylinder, and in an open passage leading from the brake-piston cylinder to the retaining-valve chamber, when the main service-valve is in an exhaust position, said means adapted to reduce only the high or excess fluid-pressure above a predetermined point flowing from an auxiliary reservoir, an auxiliary emergency-reservoir, main train or brake pipe, through emergency means, also through the piston-cylinder porous bushing to the said leakage-means chamber and brake-piston cylinder, when the main service-valve is operated by a free flow of pressure through an always-open passage from an auxiliary reservoir to the driving-piston, or when the main service-valve is cut off from the main train or brake pipe, and is being held to its seat by an excess of fluid under pressure in the main train or brake pipe, said excess pressure flowing into the leakage-valve chamber, thence to the brake-piston cylinder, at a higher point of pressure than that in the main-service-valve chamber, means operated in a retaining-valve mechanism by the excess pressure in the main train or brake pipe to close the exhaust-passage leading from the leakage-valve chamber and brake-piston cylinder to atmosphere, substantially as set forth.

112. In a quick-action automatic fluid-pressure brake system, the combination of a brake-piston cylinder, an auxiliary reservoir, a main train or brake pipe, a main-service-valve, having in a fluid-pressure brake system a pressure-plate on each car or vehicle, adapted to move between pressures to admit by its movement fluid under a greater or excess pressure from the main train or brake pipe, into a passage leading into a duplex-leakage-valve device, thence to the brake-piston cylinder, this flow of pressure into the brake-piston cylinder, will make or perpetuate an application of the brakes, any length of time desired with fluid-pressure direct from an air-charged reservoir on the locomotive, when the fluid under pressure in the main train or brake pipe is greater than the pressure on the opposite side of said plate, at any position of the main service-valve, or when the main service-valve is cut off from the main train or brake pipe, a device to close the exhaust-passage leading from the duplex-leakage-valve chamber and the brake-piston cylinder to atmosphere, with the same excess pressure that is flowing from the main train or brake pipe through under said pressure-plate to the said duplex leakage-chamber and thence to the brake-piston cylinder, substantially as set forth.

113. In a quick-action automatic fluid-pressure brake system, the combination of a brake-piston cylinder, an auxiliary reservoir, a main train or brake pipe, a main service-valve, having in a fluid-pressure brake system on each car or vehicle a pressure-plate adapted to move between pressures to admit by its movement fluid under a greater or excess pressure from the main train or brake pipe into a passage leading into a chamber containing a device to close an exhaust-passage any length of time desired, with fluid under pressure direct from an air-charged reservoir on the locomotive, leading from a duplex-leakage-valve chamber and the brake-piston cylinder to atmosphere, when the excess fluid under pressure flowing is greater than the pressure on the opposite side of said pressure-plate, the passage leading from said chamber into the duplex-leakage-valve chamber thence to the brake-piston cylinder, to admit fluid under pressure to the brake-piston cylinder from the main train or brake pipe through the retaining-valve device, after said device closes said exhaust-passage from the brake-piston cylinder, thus making or perpetuating an application of the brakes any length of time desired, after the main-service-valve chamber is cut off from the main train or brake pipe, and the fluid in said chamber is less than that in the main train or brake-pipe, substantially as set forth.

114. In a quick-action automatic fluid-pressure brake system, the combination of a brake-piston cylinder, an auxiliary reservoir, a main train or brake pipe, a main service-valve, having in an air-brake system on each car or vehicle a pressure-plate, adapted to move between pressures to admit by its movement fluid under a greater or excess pressure from the main train or brake pipe or main-service-valve chamber into a passage leading into a chamber containing a device to close the passage leading from the main train or brake pipe, into the main-service-valve chamber, so that the exhaust-passage in the system may be closed by the excess fluid-pressure in the main train or brake pipe above that pressure in the main-service-valve chamber, said device when closed is provided with means to prevent any loss of pressure through the valve-chamber to atmosphere, substantially as set forth.

115. In a quick-action automatic fluid-pressure brake system, the combination of a brake-piston cylinder, an auxiliary reservoir, a main train or brake pipe, a main service-valve, having means in an air-brake system, on each car or vehicle, when operated by difference of excess fluid under pressure in the main train or brake pipe, above the normal, fluid will be cut off from the main-service-valve chamber, and simultaneously admitted to a passage leading to the brake-piston cylinder, making or perpetuating an application of the brakes for any length of time desired, after the exhaust-passage has been closed leading from the duplex-leakage-valve chamber and the brake-piston cylinder, to atmosphere by said excess pressure, substantially as set forth.

116. In a quick-action automatic fluid-pressure brake system, the combination of a brake-piston cylinder, an auxiliary reservoir, a main train or brake pipe, a main service-valve, having means in an air-brake system on each car or vehicle, when operated by difference of excess fluid under pressure in the main train or brake pipe, above the normal, fluid will be cut off from the main-service-valve chamber, and means simultaneously closing the exhaust-passage leading from the brake-piston cylinder to the atmosphere, perpetuating an application of the brakes and continuously supplying the brake-piston cylinder, with fluid under pressure from the main train or brake pipe, through said means for any length of time desired, substantially as set forth.

117. In a quick-action automatic fluid-pressure brake system, the combination of a brake-piston cylinder, an auxiliary reservoir, a main train or brake pipe, a main service-valve, having operative means on each car or vehicle to cut off the flow of fluid-pressure from flowing into the main-service-valve chamber from the main train or brake pipe, when the pressure in said chamber or main train or brake pipe, has reached a predetermined point, means simultaneously closing the exhaust-passage leading from the duplex-leakage-valve chamber and brake-piston cylinder to atmosphere, when operated by excess pressure in the main train or brake pipe, or any other source of supply, and admitting fluid under excess pressure into passages that lead into the said duplex-leakage-valve chamber thence to the brake-piston cylinder, from the main train or brake pipe, which excess pressure operates said means to close said exhaust-passage, before the fluid-pressure flows through the chambers of said means into passages, that contain the said duplex devices to reduce such pressure to the desired point, to make or perpetuate an application of the brakes, with fluid-pressure direct from an air-charged reservoir on the locomotive, substantially as set forth.

118. In a quick-action automatic fluid-pressure brake system, the combination of a brake-piston cylinder, an auxiliary reservoir, a main train or brake pipe, a main service-valve, having operative means on each car or vehicle that will close and open the exhaust-passage repeatedly, while there is an excess of pressure in the main train or brake pipe, operating said means, said means will admit to atmosphere through the exhaust-passage and retaining-valve chamber, any fluid-pressure in the brake-piston cylinder, that is greater than desired, also any pressure may be obtained in the brake-piston cylinder, by increasing the excess pressure in the main train or brake pipe, and such pressure in the brake-piston cylinder may be reduced only by reducing the pressure in the main train or brake pipe, always keeping the differences of said pressure above the normal, when an application is perpetuated or an application of the brakes is desired by using an excess pressure in the system, which excess pressure operates a device to cut off the flow of fluid-pressure from flowing into the main-service-valve chamber, said device governs the pressure in said main-service-valve chamber to any predetermined point desired, substantially as set forth.

119. In a quick-action automatic fluid-pressure brake system, the combination of a brake-piston cylinder, an auxiliary reservoir, a main train or brake pipe, a main service-valve, having operative means to govern or regulate the fluid under pressure in the main-service-valve chamber, so that it is less than the excess pressure in the main train or brake pipe, an always-open passage between the auxiliary reservoir and said means, an always-open passage between the main-service-valve chamber and said means, substantially as set forth.

120. In a quick-action automatic fluid-pressure brake system, the combination of a brake-piston cylinder, an auxiliary reservoir, a main train or brake pipe, a main service-valve, having duplex means on each car or vehicle, to reduce the fluid-pressure as it flows through an always-open passage, into the brake-piston cylinder at any position of the main service-valve, during an application of the brakes before or after the fluid-pressure is cut off from flowing into the main-service-valve chamber, from the main train or brake pipe, substantially as set forth.

121. In a quick-action automatic fluid-pressure brake system, the combination of a brake-piston cylinder, an auxiliary reservoir, a main train or brake pipe, a main service-valve, operative means on each car or vehicle, to increase the fluid under pressure in the main train or brake pipe, auxiliary reservoir, brake-piston cylinder, during an emergency application of the brakes by a reduction of fluid under pressure in the main train or brake pipe, above that fluid under pressure that is in said parts, during a service application, made by a reduction of fluid under pressure in the main train or brake pipe, substantially as set forth.

122. In a quick-action automatic fluid-pressure brake system, the combination of a brake-piston cylinder, an auxiliary reservoir, a main train or brake pipe, a main service-valve, having operative means on each car or vehicle to prevent an application of the brakes, on a car that is charged with fluid under pressure, when a rear car is coupled and the hose-couplings coupled, said means adapted to have an excess pressure in the main train or brake pipe above that pressure in the main-service-valve chamber, said excess pressure in the main train or brake pipe is used to supply the uncharged car with fluid under pressure that is being attached at the rear of such charged fluid-pressure lines, substantially as set forth.

In testimony whereof I affix my signature in presence of two witnesses.

JOHN SCOTT BUBB.

Witnesses:
    H. A. COLWELL,
    W. POLLOCK.